US006628313B1

(12) United States Patent
Minakuchi et al.

(10) Patent No.: US 6,628,313 B1
(45) Date of Patent: *Sep. 30, 2003

(54) INFORMATION RETRIEVAL METHOD AND APPARATUS DISPLAYING TOGETHER MAIN INFORMATION AND PREDETERMINED NUMBER OF SUB-INFORMATION RELATED TO MAIN INFORMATION

(75) Inventors: Mitsuru Minakuchi, Soraku-gun (JP); Naoki Urano, Sakai (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,158

(22) Filed: Aug. 19, 1999

(30) Foreign Application Priority Data

Aug. 31, 1998 (JP) ............................................ 10-244269

(51) Int. Cl.[7] ................................................. G09G 5/00
(52) U.S. Cl. ........................ 345/853; 345/848; 345/968; 707/3
(58) Field of Search ................................ 345/853–855, 345/848, 850, 764; 707/102, 3

(56) References Cited

U.S. PATENT DOCUMENTS

| | | | | |
|---|---|---|---|---|
| 5,295,243 A | * | 3/1994 | Robertson et al. | 345/649 |
| 5,787,420 A | * | 7/1998 | Tukey et al. | 707/2 |
| 5,801,680 A | * | 9/1998 | Minakuchi | 340/995 |
| 5,835,085 A | * | 11/1998 | Eick et al. | 345/440 |
| 5,844,559 A | * | 12/1998 | Guha | 345/821 |
| 5,930,787 A | * | 7/1999 | Minakuchi et al. | 707/2 |
| 6,018,344 A | * | 1/2000 | Harada et al. | 345/440 |
| 6,076,086 A | * | 6/2000 | Masuichi et al. | 707/3 |
| 6,088,032 A | * | 7/2000 | Mackinlay | 345/848 |
| 6,219,053 B1 | * | 4/2001 | Tachibana et al. | 345/440 |
| 6,243,093 B1 | * | 6/2001 | Czerwinski et al. | 345/764 |
| 6,297,824 B1 | * | 10/2001 | Hearst et al. | 345/848 |
| 6,330,576 B1 | * | 12/2001 | Mochizuki et al. | 707/3 |

FOREIGN PATENT DOCUMENTS

JP 8-249352 9/1996

OTHER PUBLICATIONS

Staples ("Representation in Virtual Space: Visual Convention in the Graphical User Interface", ACM InterCHI '93, pp. 348–354).*
IBM Technical Disclosure Bulletin ("Dynamic Icon Presentation", vol. 35, Issue 4B, pps. 227–232, Sep. 1992).*

* cited by examiner

Primary Examiner—Sy D. Luu
(74) Attorney, Agent, or Firm—Nixon & Vanderhye P.C.

(57) ABSTRACT

In an information retrieval method that allows the user to retrieve information in an intuitive way even when the user only has a vague requirement, information is retrieved from a memory device in which a plurality of information are stored. The information retrieval method includes the steps of determining whether any of a predetermined number of sub-information displayed in advance is selected or not: setting selected information as main information when any of the sub-information is selected; calculating the level of relationship with the main information for each information other than the main information stored in the memory device when any of the sub-information is selected and selecting the predetermined number of sub-information according to the level of relationship; displaying the main information; and displaying the predetermined number of sub-information.

42 Claims, 18 Drawing Sheets

FIG.4

| ID | TITLE | AUTHOR | DATE OF ISSUE | IMAGE DATA | COMMENTARY DATA | KEYWORD | ... |
|---|---|---|---|---|---|---|---|
| 1 | MEZON IKKOKU | TAKAHASHI RUMIKO | 1982 | MezonIkkoku.jpg | MezonIkkoku.txt | COMIC · ROMANCE | |
| 2 | NINJYO BAKA MONOGATARI | KAWAGUCHI SHOTARO | 1995 | Ninjoubaka.jpg | Ninjoubaka.txt | NOVEL · HUMANITY · TRADITIONAL | |
| 3 | JUICHIMEN KANNON JUNREI | SHIRASU SHOKO | 1992 | Juichimen.jpg | Juichimen.txt | NOVEL · TRAVELOGUE | |
| 4 | SENGOKU YAWA | ENDO SHUSAKU | 1996 | Sengokuyawa.jpg | Sengokuyawa.txt | ESSAY · HISTORY · BATTLE | |
| 5 | GINGATETSUDOU 999 | MATSUMOTO REIJI | 1989 | 999.jpg | 999.txt | COMIC · SF · ADVENTURE | |
| 6 | GENJU NO HANASHI | IKEUCHI TADASHI | 1994 | Genju.jpg | Genju.txt | PAPERBACK · FANTASY | |
| 7 | GINGATETSUDOU NO YORU | MIYAZAWA KENJI | 1995 | Gingatetsudou.jpg | Gingatetsudou.txt | NOVEL · FAIRY TALE | |
| 8 | MEITANTEI KONAN | AOYAMA YOSHIMASA | 1996 | Konan.jpg | Konan.txt | COMIC · DETECTIVE | |
| 9 | SAKUTAI KAGAKU | MIZUMACHI KUNIHIKO | 1991 | Sakutai.jpg | Sakutai.txt | ACADEMIC · CHEMISTRY | |
| ... | | | | | | | |

FIG.18 PRIOR ART

RETRIEVAL CONDITION

NAME OF AUTHOR

TYPE ◉ NOVEL ○ COMIC ○ ESSAY
○ PAPERBACK ○ ACADEMIC ○ MAGAZINE

DATE OF ISSUE

KEYWORD

RETRIEVAL EXECUTION    RESET

RETRIEVAL RESULT

INFORMATION RETRIEVAL METHOD AND APPARATUS DISPLAYING TOGETHER MAIN INFORMATION AND PREDETERMINED NUMBER OF SUB-INFORMATION RELATED TO MAIN INFORMATION

BACKGROUND OF THE INVENTION

1. Field of the Invention

The present invention relates to an information retrieval method and apparatus that retrieves information according to the user's taste from a great number of information. More particularly, the present invention relates to an information retrieval method and apparatus that can retrieve desired data efficiently by following related information.

2. Description of the Background Art

There are two typical methods of searching for desired information manually from a large amount of information. The first method is to view all the information and select a desired one therefrom. The second method is to sort the information according to a certain standard, such as a keyword representing the type, the produced date, or contents of the information, and select the desired information from the sorted group in which the desired information is expected to be included. However, there was a limit in effecting the information retrieval task manually when the amount of information becomes enormous.

Many information retrieval apparatuses utilizing the computer have been proposed to aid the search of information. An example of a general retrieval apparatus utilizing the computer will be described with reference to FIG. 18. The user sets the retrieval condition such as the title or assigned keyword corresponding to the desired information and depresses the retrieval execution button. Information matching the condition set by the user is displayed as the result of the search. The user selects the desired information therefrom to verify the detail of each information.

It is desirable to search for each information visually through images or motion pictures. The same applies for visualized information such as numerical information represented in a graph. An example of a conventional general image retrieval system will be described with reference to FIG. 19. A list of reduced representations of the stored images are provided on the display screen. The user searches for a desired image therefrom to display that image in an expanded manner or to use it for another application. When there are too many numbers of reduced images to be displayed on one screen, scrolling can be effected through windows or the page can be changed. By means of the retrieval function, the image corresponding to the keyword specified by the user can be retrieved from the information held by the image per se or the information assigned to the image.

In the image retrieval apparatus disclosed in Japanese Patent Laying-Open No. 8-249352, the feature value for retrieval is set on the XY coordinates to extract and display images having a feature value approximating that feature value. According to this image retrieval apparatus, the user can list up the approximating images and compare the images to select an image satisfying his/her taste.

In the actual search of information, the user may not necessarily have a definite idea in advance. For example, the user may be attracted to a picture of a mountain while looking at pictures of landscape, and then be attracted to a mountain piled with snow while looking at pictures of mountains. The user will build up a more definite design while browsing through the images.

Alternatively, the user looking at a picture of a friend, for example, may wish to look at another picture of that friend, and then may want to look at another picture of the place shown in the previous picture. Thus, the user may have no definite aim in the search of images, and look up for associated images as they are brought to mind.

In such circumstances, the conventional retrieval by keywords and the like is not so effective since the user cannot explicitly convey his/her own requirement to the system. The aforementioned image retrieval apparatus disclosed in Japanese Patent Laying-Open No. 8-249352 that can determine an image of interest from analogous images had a similar disadvantage since the feature value had to be set for the retrieval of comparable images.

The system that displays information visually as a clue in the retrieval of information had the problem that the amount of information that can be displayed on one screen is limited. A system that can display more images on one screen by moving and displaying images visually in a three dimensional manner is known. However, this system is directed to display prepared images, and is not directed to information retrieval.

SUMMARY OF THE INVENTION

In view of the foregoing, an object of the present invention is to provide an information retrieval method and apparatus that allows information retrieval as brought to mind while referring to related information even when the user only has a vague idea of requirement, and a recording medium recorded with a program of an information retrieval method.

Another object of the present invention is provide an information retrieval method and apparatus that allows the level of relationship between displayed information to be recognized in an intuitive way, and that allows information retrieval as brought to mind, and a recording medium recorded with a program of an information retrieval method.

A further object of the present invention is provide an information retrieval method and apparatus that allows information retrieval to be carried out easily by moving displayed information to a position of better visualization for the user, and a recording medium recorded with a program of an information retrieval method.

Still another object of the present invention is to provide an information retrieval method and apparatus that allows information retrieved so far to be confirmed again, and a recording medium recorded with a program of an information retrieval method.

A still further object of the present invention is to provide an information retrieval method and apparatus that allows information of interest to be temporarily saved during the process of retrieval and carry out another retrieval, and a recording medium recorded with a program of an information retrieval method.

Yet a further object of the present invention is to provide an information retrieval method and apparatus that allows retrieval while confirming detailed information associated with the retrieved information, and a recording medium recorded with a program of an information retrieval method.

According to an aspect of the present invention, an information retrieval method retrieves information from a memory device in which a plurality of information are stored. The information retrieval method includes the steps of determining whether any of a predetermined number of sub-information displayed in advance is selected or not, setting the selected information as the main information when one of the sub-information is selected, calculating the level of relationship with the main information for each of the information other than the main information stored in the memory device when one of the sub-information is selected and select the predetermined number of sub-information according to the level of relationship, displaying the main information, and displaying the predetermined number of sub-information.

The information related to the information displayed as the main information is displayed together as sub-information. By selecting the sub-information and displaying the same as the new main information, information related to the information displayed as the new main information is displayed as the new sub-information. Therefore, the user can search through the related information for finding the desired information.

Preferably, the step of selecting a predetermined number of sub-information includes the steps of calculating the level of relationship between the main information and each information stored in the memory device other than the main information, calculating the value of a color corresponding to the level of relationship, and selecting the predetermined number of sub-information according to the level of the relationship. The step of displaying the predetermined number of sub-information includes the step of displaying each of the predetermined number of sub-information in a color representing the level of relationship of the sub-information.

Since the level of relationship between the main information and the sub-information is represented in color, the user can recognize the level of relationship between information in an intuitive way.

Further preferably, the step of displaying the predetermined number of sub-information includes the step of receiving an amount of rotation and rotating said predetermined number of sub-information by the rotation amount for display.

Since the position of information displayed as the sub-information can be altered by a rotation amount input operation, the user can move the sub-information to a desirable position for better visualization for the user. Thus, information retrieval is facilitated.

Further preferably, the information retrieval method further includes the steps of storing history of the main information, and displaying the main information displayed thus far according to the history.

The user can confirm again the information once retrieved since the history of the information displayed as the main information can be followed.

Further preferably, the information retrieval method further includes the step of registering a selected information out of the displayed main information and sub-information.

Since the user sets and stores the displayed information as the information of interest, the user can temporarily save information of interest during the retrieval process and carry out another retrieval.

Further preferably, the information retrieval method includes the step of displaying detailed information of the displayed main information.

Since detailed information of the main information is displayed, the user can carry out information retrieval while checking the detailed contents.

A computer-readable recording medium according to another aspect of the present invention is recorded with a program of an information retrieval method that retrieves information from a memory device in which a plurality of information are stored. The information retrieval method includes the steps of the determining whether any information of a predetermined number of sub-information displayed in advance is selected or not, setting a selected information as main information when one of the sub-information is selected, calculating the level of relationship between the main information and each information stored in the memory device excluding the main information when any sub-information is selected and selecting the predetermined number of sub-information according to the level of relationship, displaying the main information, and displaying the predetermined number of sub-information.

Information related to the information displayed as the main information is displayed together as the sub-information. By selecting sub-information and displaying the selected sub-information as the new main information, information related to the information that is now displayed as the new main information can be displayed as the sub-information. Therefore, the user can search for information of interest in an intuitive way while viewing the related information.

According to a further aspect of the present invention, an information retrieval apparatus includes a memory device of a plurality of information with main information and predetermined number of sub-information, a display device of the main information and the predetermined number of sub-information, an input device receiving designation from the user, a relationship level calculation unit connected to the memory device to calculate the level of relationship between the main information and each of the plurality of information other than the main information, a sub-information display unit connected to the relationship level calculation unit, the memory device, and the display device to select and display the predetermined number of sub-information from the plurality of information other than the main information according to the level of relationship, and a main information display unit connected to the input device, the memory device, and the display device to detect selection of any of the predetermined number of sub-information to set the selected sub-information as the new main information, and displaying that main information.

The information related to the information displayed as the main information is displayed together as the sub-information. By selecting the sub-information and displaying the selected sub-information as the new main information, information related to the information that is displayed as the new main information can be displayed as the sub-information. Therefore, the user can search the related information for finding information of interest in an intuitive way.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an example of information according to an embodiment of the present invention.

FIGS. 18 and 19 are diagrams to describe a conventional information retrieval apparatus.

DESCRIPTION OF THE PREFERRED EMBODIMENTS

First Embodiment

An information retrieval method according to a first embodiment of the present invention will be described in detail hereinafter with reference to the drawings.

Figure 1:
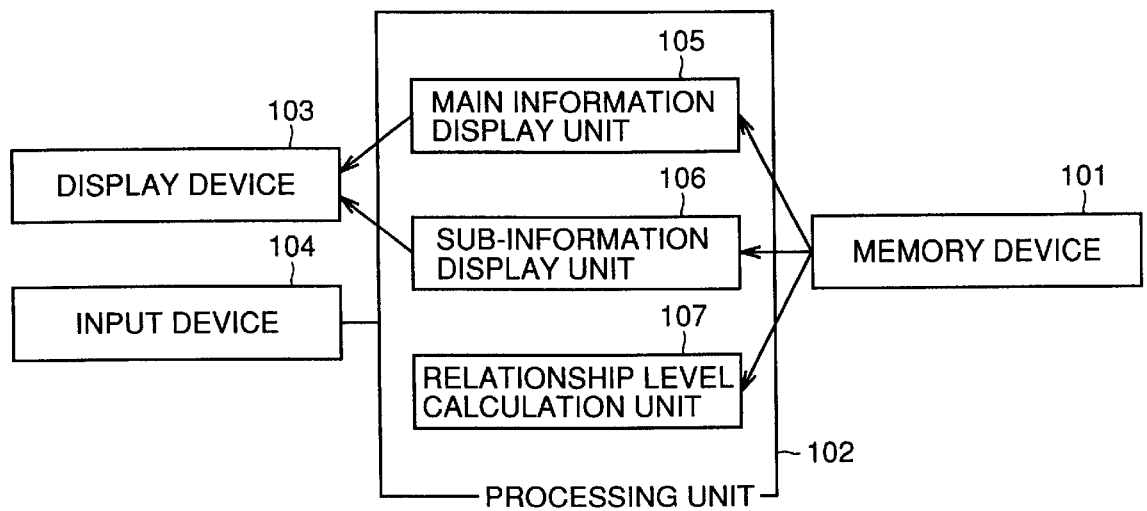
FIG. 1 is a block diagram showing a structure of an embodiment of the present invention.

Referring to FIG. 1, a general computer apparatus that can execute an information retrieval method according to the first embodiment of the present invention includes a memory device 101, a processing unit 102 connected to memory device 101, and a display device 103 and an input device 104 connected to processing unit 102. Memory device 101 is formed of a magnetic disk, an optical disk, a memory, or the like. Processing unit 102 is a general computer formed of a MPU (Micro Processing Unit), a RAM (Random Access Memory), a ROM (Read Only Memory) and the like to control the process and provide control of memory device 101, display device 103 and input device 104. Display device 103 is formed of a CRT (Cathode Ray Tube), liquid crystal display, or the like to display information and images. Input device 104 is formed of an input device such as a keyword, a mouse, or the like to carry out various entries such as selecting information displayed on display device 103.

The information retrieval program is supplied through a recording medium such as a magnetic tape, a CD-ROM (Compact Disc-Read Only Memory), or the like. The information retrieval program is executed by the processing unit 102. The user operates input device 104 while viewing at display device 103 to carry out information retrieval. The information retrieval program can be supplied to the processing unit 102 from another computer through a communication channel via a communication modem (not shown).

The information that becomes the subject of retrieval is stored in memory device 101. Alternatively, this information can be read in real time through a communication channel.

Processing unit 102 also includes a main information display unit 105 connected to memory device 101 and display device 103 to supervise the main information among the information stored in memory device 101 and display the main information at display device 103, a sub-information display unit 106 connected to memory device 101, display device 103, and a relationship level calculation unit 107 that will be described afterwards to supervise the sub-information among the information stored in memory device 101 and display the sub-information at display device 103, and relationship level calculation unit 107 connected to memory device 101 and sub-information display unit 106 to calculate the level of relationship between information.

Figure 2:
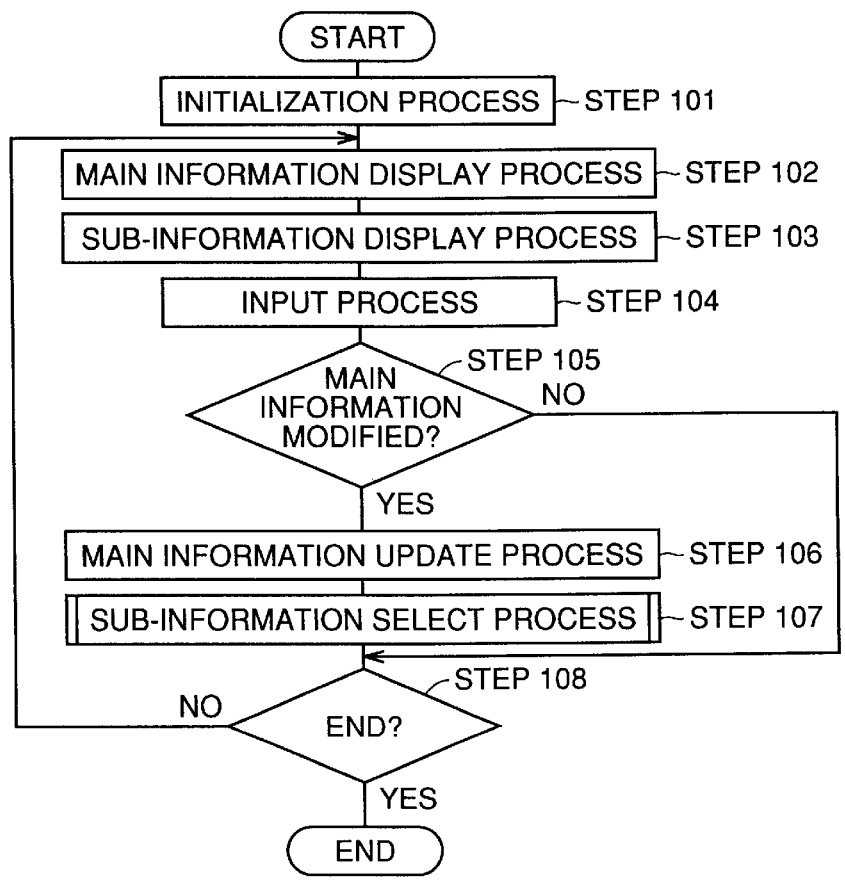
FIG. 2 is a flow chart showing the entire process of an embodiment of the present invention.

An information retrieval process of the first embodiment will be described with reference to FIG. 2.

First, an initialization process for display is carried out (STEP 101). Here, the information to be displayed as the initial main information and the information to be displayed as the initial sub-information are respectively set in main information display unit 105 and in sub-information display unit 106. The setting of the initial sub-information can be carried out by a process identical to a sub-information select process (STEP 107) that will be described afterwards.

Then, the information set in main information display unit 105 is displayed at display device 103 (STEP 102). Main information display unit 105 can supervise the index of the information to be displayed and read in real data of the information from memory device 101 when the data is to be actually displayed. In displaying information, main information display unit 105 can display an image when image data is included in the information or an output image such as text data from a word processor, or an icon representing the contents of the information.

Then, the information set in sub-information display unit 106 is displayed at display device 103 (STEP 103). Similar to STEP 102, sub-information display unit 106 can supervise the index of the information to be displayed, and reads in the real data of information from memory device 101 when the data is to be actually displayed. The information can be displayed in a manner similar to that of main information display unit 105.

At STEP 102 or 103, the manner of displaying information can be switched according to whether the information is to be described as the main information or as the sub-information, or according to the size of the information to be displayed. For example, an image can be displayed for the main information, and just an icon can be displayed for the sub-information.

Then, the entry process by the user is carried out through input device 104 (STEP 104). The user input manipulation includes various operations such as "Select the displayed information by a pointing device such as a mouse."

Then, determination is made whether there was an entry of replacing the main information with another information at the input process of STEP 104 (STEP 105). When the main information is updated (YES at STEP 105), control proceeds to STEP 106. If the main information is not updated (NO at STEP 105), control proceeds to STEP 108. When the main information is updated at STEP 105 (YES at STEP 105), the main information under control of main information display unit 105 is updated to the information specified at STEP 104 (STEP 106). The sub-information under control of sub-information display unit 106 is updated (STEP 107). The details of the sub-information select process (STEP 107) will be described afterwards in detail. Then, determination is made whether the user has specified an end process (STEP 108). When NO at STEP 108, control returns to STEP 102.

Figure 3:
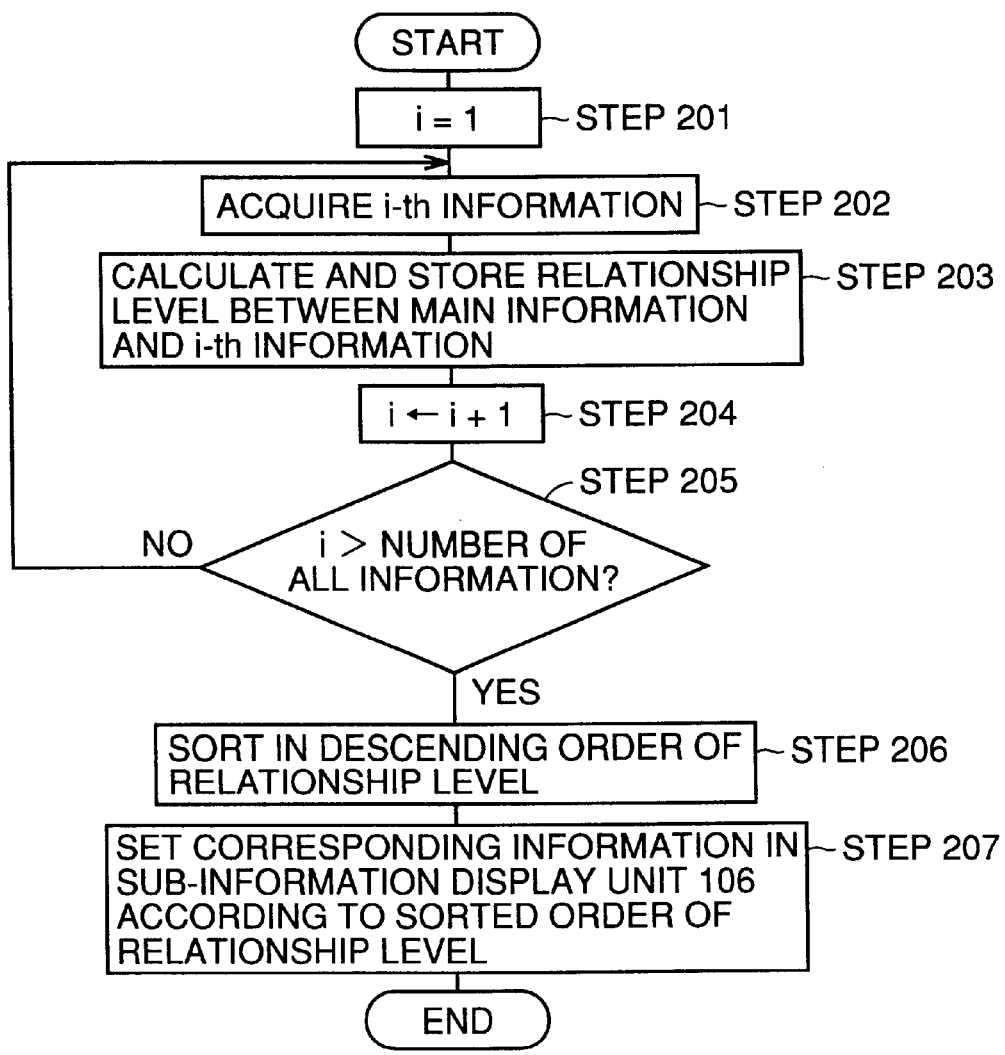
FIG. 3 is a flow chart showing in detail the process of an embodiment of the present invention.

The process of STEP 107 of FIG. 2 will be described in detail with reference to FIG. 3.

Counter i is initialized to 1 (STEP 201). Relationship level calculation unit 107 acquires the i-th information out of the information stored in memory device 101 (STEP 202). Relationship level calculation unit 107 calculates the level of relationship between the main information and the i-th information acquired at STEP 202. The calculated relationship level is stored with the value of i as a set (STEP 203). The calculation of the level of relationship will be described afterwards. Then, counter i is incremented by 1 (STEP 204). Determination is made whether the value of i is greater than the number of all information stored in memory device 101 (STEP 205).

When the value of i is greater than the number of information (YES at STEP 205), control proceeds to STEP 206. Otherwise (NO at STEP 205), the process of STEPs 202–205 is repeated. The relationship levels stored at STEP 203 are sorted in the descending order of the value (STEP 206). Since the value of i stored as a set is also sorted, the entire information are sorted in the order of relationship with the main information.

Relationship level calculation unit 107 sets the information corresponding to the sorted order in sub-information display unit 106 (STEP 207). Here, the information to be set can correspond to the number of the information to be displayed at display unit 103 in sub-information display unit 106, or to the entire information for the purpose of altering the number of displays afterwards.

FIG. 4 shows the information on books as an example of information stored in memory device 101. An example of calculating the level of relationship carried out at STEP 203 of FIG. 3 by relationship level computation unit 107 will be described hereinafter with reference to FIG. 4.

In information memory device 101 are stored an ID number assigned to each stored information, the title of the book, the author, data of issue, the file name of a sample image, the file name of the commentary, keywords, and the like.

An example of calculating the level of relationship using the keyword in FIG. 4 will be described. Let the level of relationship be calculated by the following equation.

$$\alpha_{i,j} = N_{shared}/N_{unique}$$

where $\alpha_{i,j}$ is the level of relationship between the i-th information and the j-th information, $N_{shared}$ is the number of keywords included in both the i-th information and the j-th information, $N_{unique}$ is the number of all the types of keywords included in the i-th information and the j-th information ($0 \leq \alpha_{i,j} \leq 1$). In the case of the information of ID=1 and ID=5, for example, the number of keywords included in both the i-th and j-th information is 1 {comic}. Therefore, $N_{shared}=1$. Also, since the type of keywords included in both the i-th and j-th information are {comic, romance, SF, and adventure}, $N_{unique}=4$. Thus, $\alpha_{1,5}=1/4=0.25$.

In the calculation of the relationship level by comparing the keywords, a table in numerics representing the similarity of the meaning between keywords can be prepared. The relationship level can be calculated referring to that table.

Alternatively, the relationship level can be calculated by comparing the string of characters such as the title. Words are cut out according to the morphological analysis of the Japanese grammar from the string of characters. Using respective words as a keyword, the relationship level is calculated by comparing these keywords. In the example of FIG. 4, "Gingatetsudou 999" is resolved into "ginga", "tetsudou" and "999". Also, the title of "Gingatetsudou no yoru" is resolved into "ginga", "tetsudou", "no", and "yoru". Therefore, the relationship level is 2/5=0.4. Here, the particle "no" can be excluded from the keyword. In this case, the relationship level becomes 2/4=0.5.

There is another method of calculating the relationship level by comparing the string of characters. Assuming that the common partial string of characters of the longest length is $L_{shared}$, and the length of the longer string of characters of comparison is $L_{longer}$, the relationship level can be calculated as $\alpha_{i,j}=L_{shared}/L_{longer}$. For example, focusing on "Gingatetsudou 999" and "Gingatetsudou no yoru", "gingatetsudou" is the longest common partial string of characters. Therefore, $L_{shared}=13$. The string of characters to be compared (gingatetsudou 999) is longer. The length thereof is $L_{longer}=16$. Therefore, the relationship level is 13/16=0.8125.

Also, the relationship level can be calculated by comparing numerical values such as the year of issue. In this case, let the smallest value of all the numerics of the information stored in memory device 101 be $V_{min}$ and the largest value be $V_{max}$, respectively. Let the value of the numerics of the i-th information and the j-th information be $V_i$ and $V_j$, respectively. Accordingly, the relationship level is defined as below.

$$\alpha_{i,j}=|V_i-V_j|/(V_{max}-V_{min})$$

Alternatively, the standardized score of the entire information stored in memory device 101 can be obtained, and the smallest value and the largest value set as $Z_{min}$ and $Z_{max}$, respectively. Assuming that the standardized score of the numerics of the i-th information and the j-th information is $Z_i$ and $Z_j$, respectively, the following equation can be established.

$$\alpha_{i,j}=1.0-|Z_i-Z_j|/(Z_{max}-Z_{min})$$

The process of obtaining the standardized score is already known in the field of general processing statistics. Therefore, description thereof will not be repeated here.

It is possible to add data other than those described above in the calculation for the relationship level. Furthermore, if the information stored in memory device 101 will not be altered dynamically, it is not necessary to calculate the relationship level every time it is needed. Values calculated in advance can be stored in memory device 101. The value can be referred to by looking into memory device 101.

The relationship level can be calculated using a plurality of types of data. In this case, the degree of contribution to the relationship level can be taken into account for each type of data. More specifically, when there are n types of data, the relationship level a can be set as below.

$$\alpha = \sum_{k=1}^{n} w_k \alpha_k$$

where $w_k$ is the weighting coefficient of the k-th type of data, and $\alpha_k$ is the relationship level of the k-th type of data. By allowing the weighting coefficient for every data type to be set by the user, the type of data to which significance is to be applied to search for related information according to the status can be set. For example, setting can be provided to attach importance to a keyword corresponding to a piece of information or to the date of issue.

An example of retrieval according to the information retrieval method of the present invention will be described with reference to FIGS. 5–7.

Figure 5:
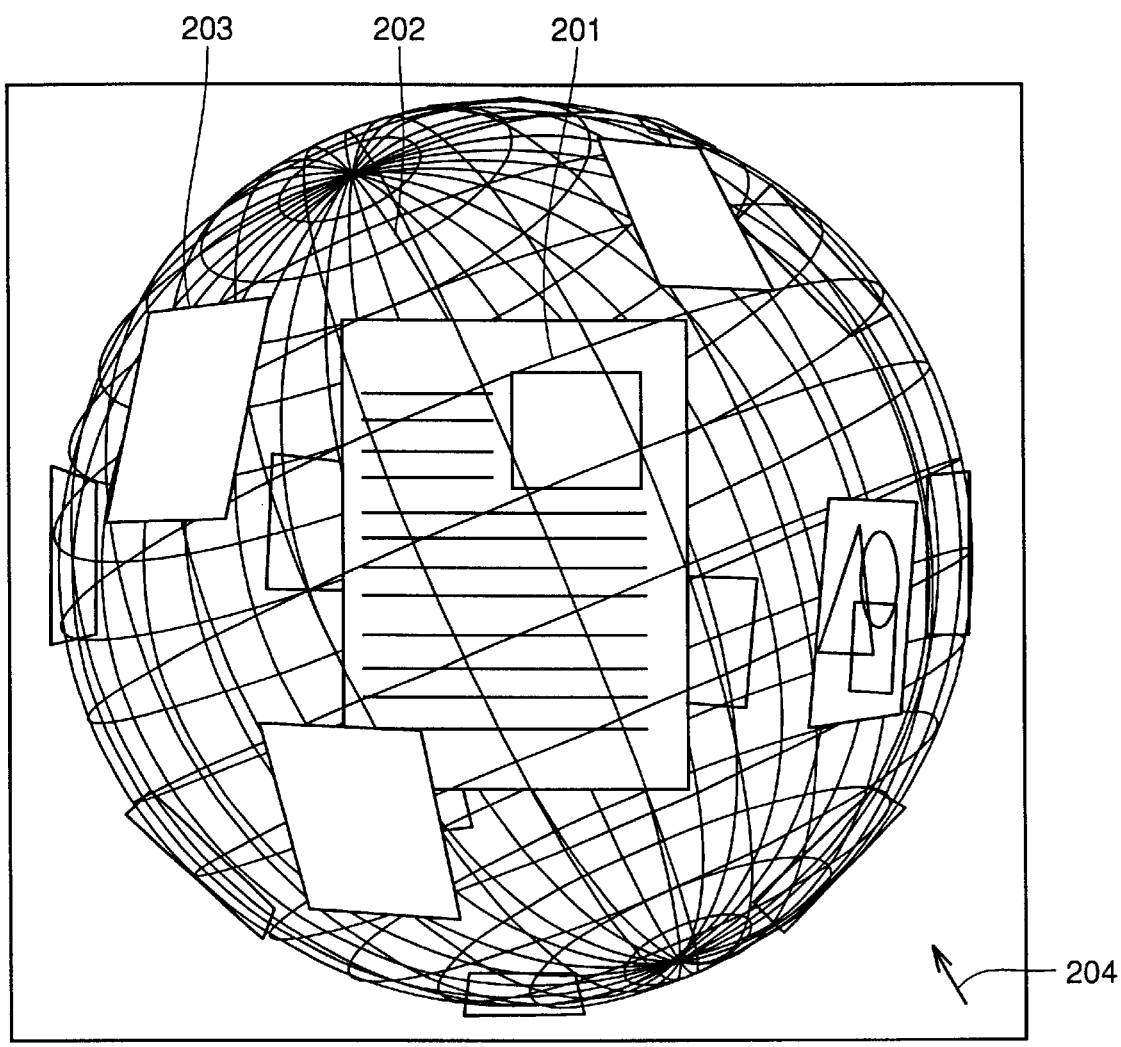
FIGS. 5, 6 and 7 show examples of display of an embodiment of the present invention.

Referring to FIG. 5, main information 201 is displayed at the center of the display screen. Sub-information 203 is affixed onto a virtual sphere 202 centered about main information 201. Main information 201 and sub-information 203 are displayed in a three-dimensional manner.

The user rotates virtual sphere 202 by means of input device 104 to move the displayed sub-information to a position for better visuality. Input device 104 may be a trackball, whereby the rotation of the trackball corresponds to the rotation of virtual sphere 202. Alternatively, the keyboard may be employed as input device 104. Virtual sphere 202 can be rotated at a constant angle in the direction corresponding to the depression of an appropriate cursor key. Alternatively, a pointing device such as a mouse can be employed as input device 104. The so-called virtual trackball function can be adopted to move a cursor 204 on the screen to specify a certain point on virtual sphere 202, whereby virtual sphere 202 is rotated in response to designation of the destination of the shifted point on the screen.

In the present embodiment, the sub-information is displayed as being arranged on a virtual sphere. However, the sub-information can be arranged on a cylindrical or spiral manner. Also, the sub-information of a higher relationship level can be arranged close to the main information whereas the sub-information of lower level of relationship can be arranged remote from the main information. Furthermore, the information can be displayed, not in a three-dimensional manner, but in a two dimensional manner, or in an overlapping manner in a semi-transparent representation. The sub-information can be shifted to a location that can be readily viewed by the user. For example, the angle of display can be adjusted so that the sub-information appears to be substantially horizontal on the display screen. Also, the sub-information of a posture showing the backside can be moved to show the frontside.

Figure 6:
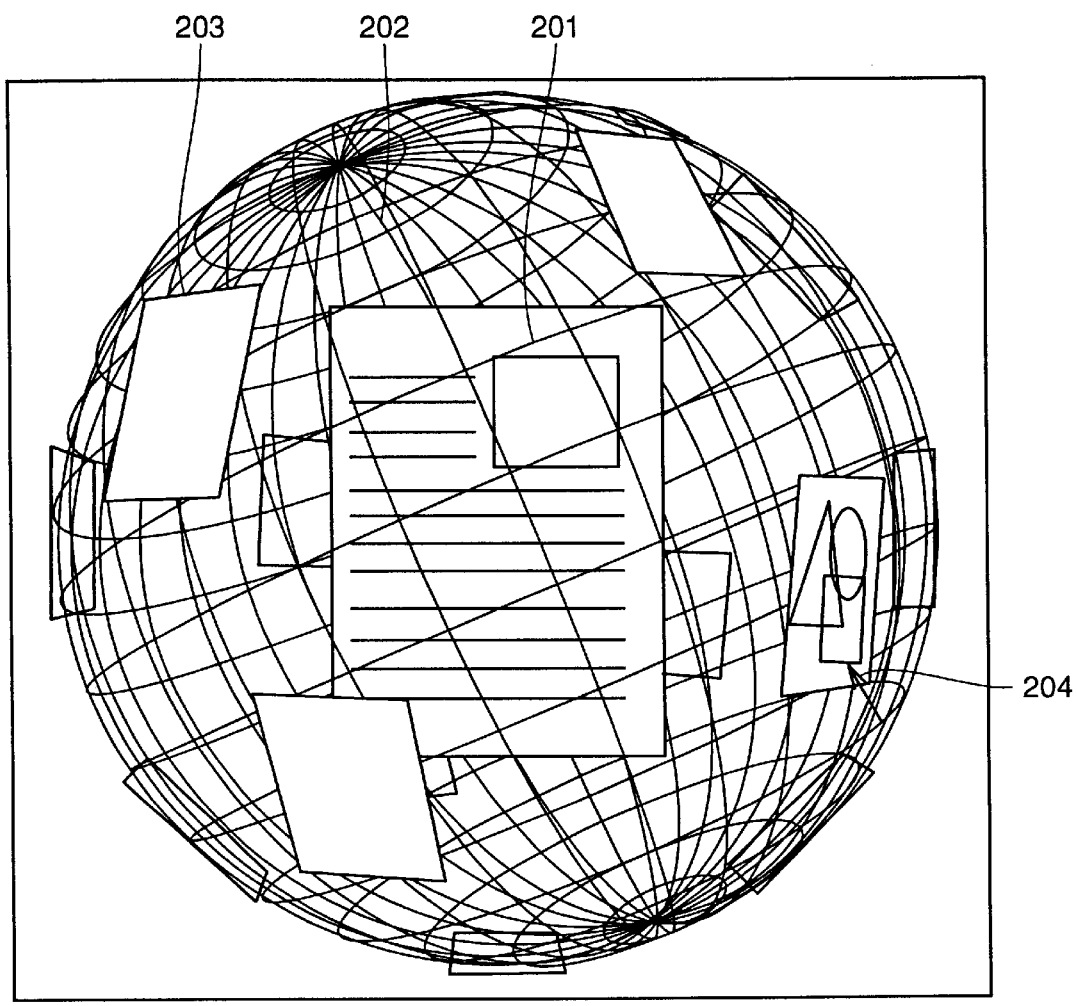
Figure 7:
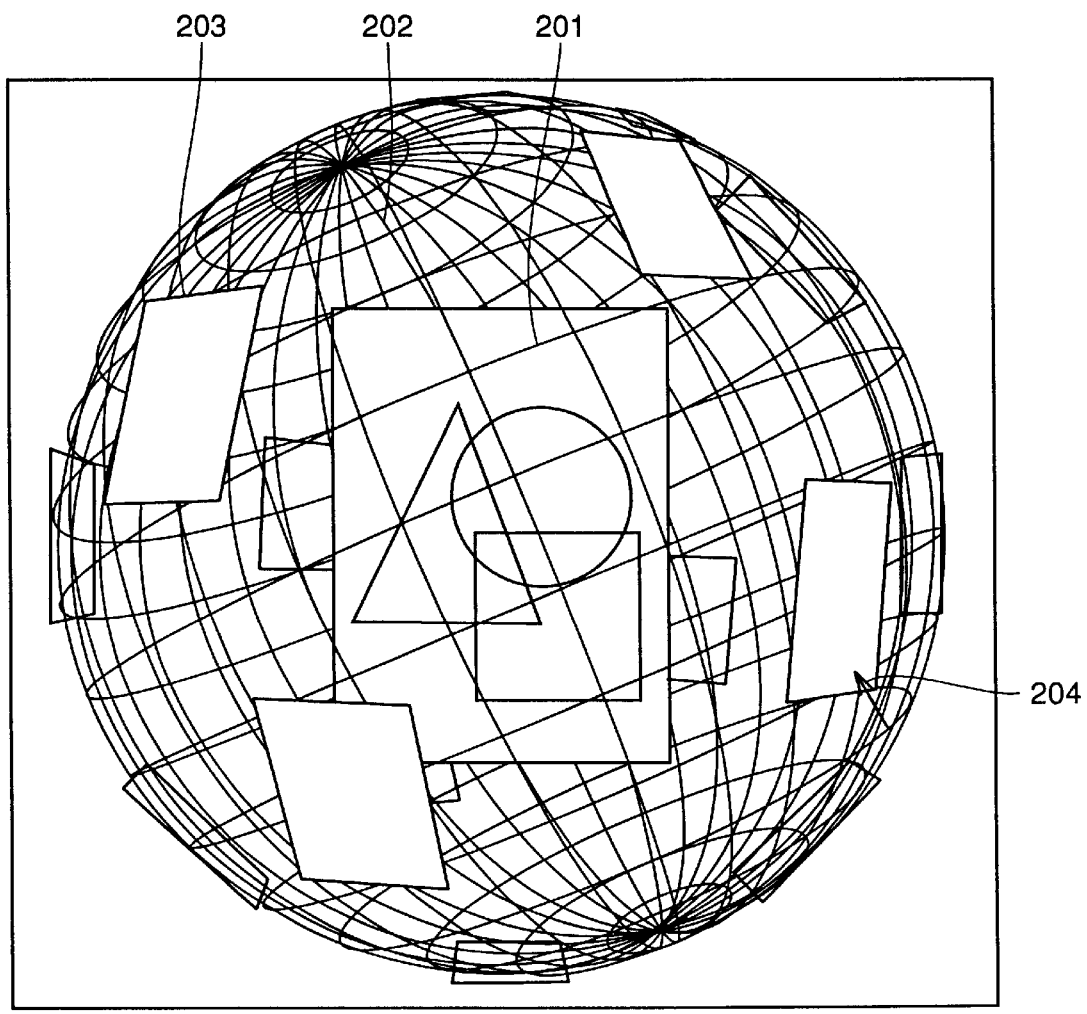

FIGS. 6 and 7 are diagrams to describe an example of the operation to retrieve related information from the state of FIG. 5.

Referring to FIG. 6, the user designates information of interest from the plurality of sub-information 203 displayed on the sphere using a mouse cursor 204 as input device 104. If there is no information of interest displayed as sub-information 203, the display can be switched to provide another information to be displayed for sub-information 203.

Upon selection of sub-information 203 designated by the user through depression of a select key, the selected information becomes the new main information. This corresponds to the determination of the main information being modified at STEP 105 of FIG. 2. Accordingly, the selected information is displayed as main information 201, corresponding to the process of STEPs 106 and 107. Information related to the new main information 201 is retrieved and displayed as sub-information 203.

According to the information retrieval method of the first embodiment, the information of interest and related information thereof are displayed together. The user can select the information satisfying his/her taste therefrom. When that accepted information is replaced as the main information, the related information is also updated. Thus, the user can search for the desired information by following or tracing information of interest even when his/her idea of the information to be retrieved is not yet specific.

Second Embodiment

Figure 8:
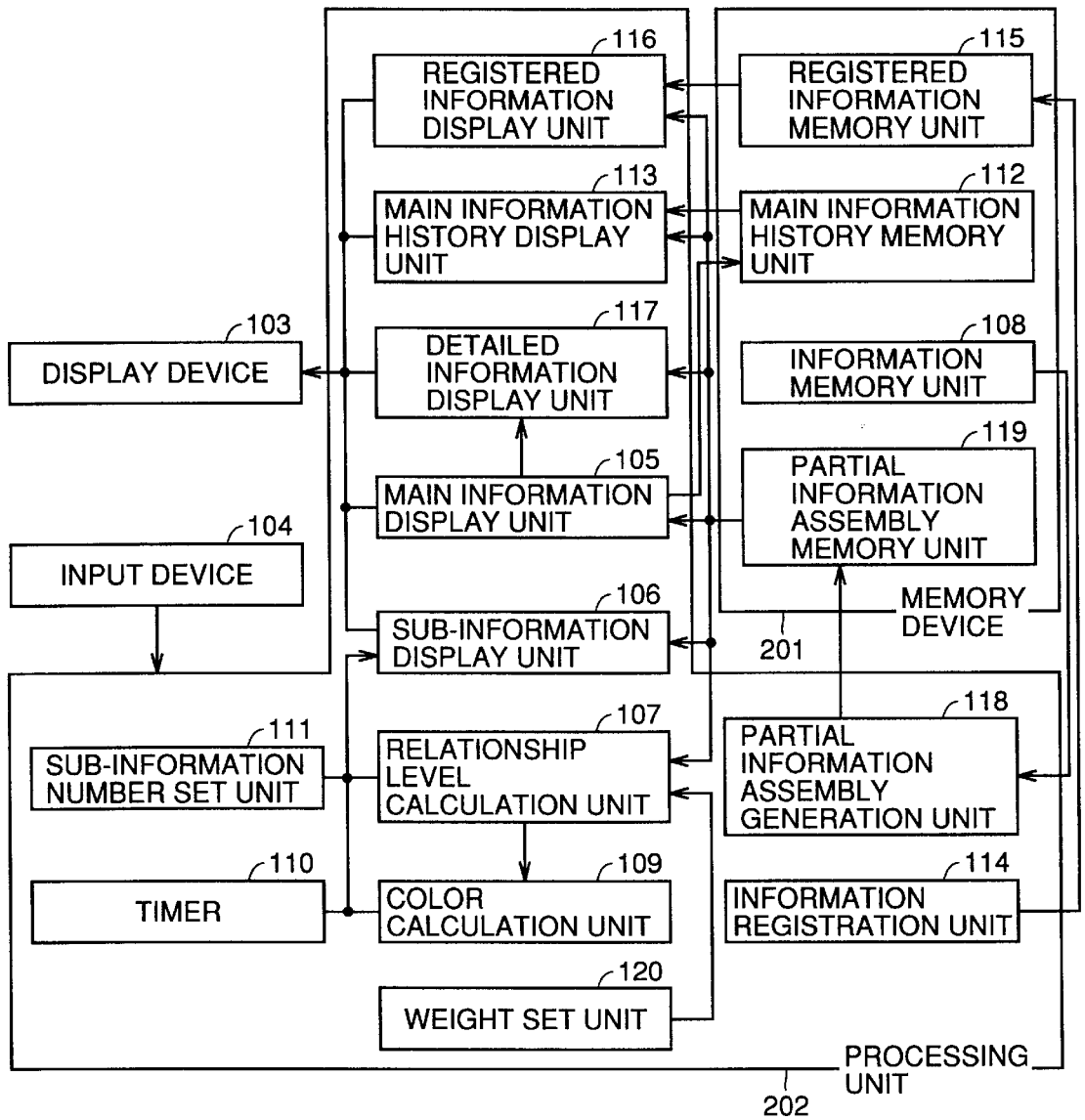
FIG. 8 is a block diagram showing a structure of another embodiment of the present invention.

Referring to FIG. 8, an information retrieval apparatus to carry out the information retrieval method according to a second embodiment of the present invention includes a memory device 201, a processing unit 202 connected to memory device 201, an input device 104 connected to processing unit 202, and a display device 103 connected to a registered information display unit 116, a main information history display unit 113, a detailed information display unit 117, a main information display unit 105 and a sub-information display unit 106.

Memory device 201 includes an information memory unit 108 storing information that becomes the subject of retrieval, a main information history memory unit 112 connected to main information display unit 105 to store the history of the information selected as the main information, a registered information memory unit 115 connected to information registration unit 114 to store the information registered at information registration unit 114, and a partial information assembly memory unit 119 connected to a partial information assembly generation unit 118 that will be described afterwards to store a partial information assembly generated at partial information assembly generation unit 118.

Processing unit 202 includes a main information display unit 105 connected to partial information assembly memory unit 119, a sub-information display unit 106 connected to partial information assembly memory unit 119, relationship level calculation unit 107, a color calculation unit 109 (described afterwards), a timer 110 (described afterwards) and a sub-information number set unit 111 (described afterwards), a relationship level calculation unit 107 connected to partial information assembly memory unit 119 and a weight set unit 120 that will be described afterwards, and a color calculation unit 109 connected to relationship level calculation unit 107 to calculate a color according to the value of the relationship level. In the present embodiment, the level of relationship of the sub-information with respect to the main information is displayed so as to be differentiated by the color or brightness.

Processing unit 202 further includes a timer 110 connected to sub-information display unit 106 to count the time to cause an interruption, a sub-information number set unit 111 connected to sub-information display unit 106 to set the number of sub-information to be displayed, a main information history display unit 113 connected to main information history memory unit 112 and partial information assembly memory unit 119 to display information stored in main information history memory unit 112, an information registration unit 114 connected to registered information memory unit 115 to select and register the main information or the sub-information that is displayed, a registered information display unit 116 connected to registered information memory unit 115 and partial information assembly memory unit 119 to display the information stored in registered information memory unit 115, a detailed information display unit 117 connected to partial information assembly memory unit 119 and main information display unit 105 to display detailed information of the main information, a partial information assembly generation unit 118 connected to information memory unit 108 and partial information assembly memory unit 119 to select information matching a predetermined condition from the information stored in information memory unit 108 to generate an assembly thereof, and a weight set unit 120 connected to relationship level calculation unit 107 to set a weight contributing to the relationship level for every type of each information in calculating the relationship level at relationship level calculation unit 107.

Main information history memory unit 112, registered information memory unit 115 and partial information memory unit 119 store only the index of the information to be stored. The information to be stored in information memory unit 108 is respectively referred to through the index, when necessary.

Figure 9:
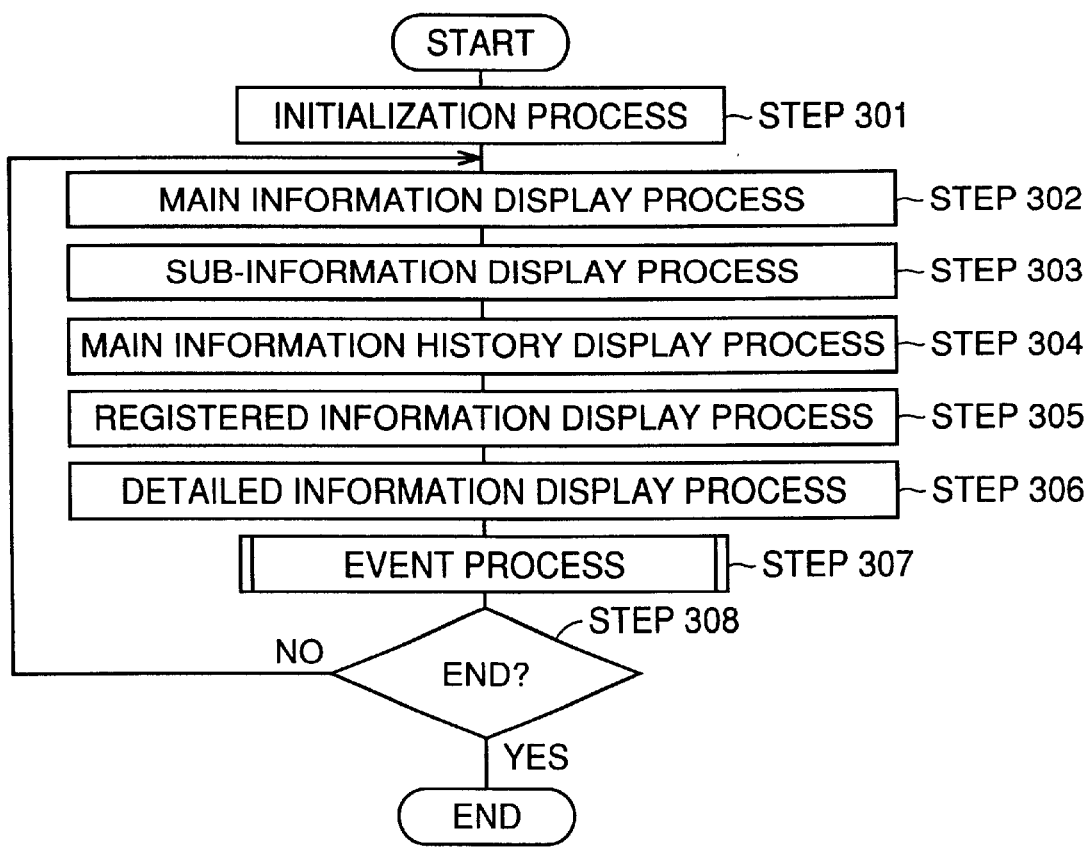
FIG. 9 is a flow chart showing the entire process of another embodiment of the present invention.

An information retrieval process according to the second embodiment of the present invention will be described with reference to FIG. 9.

First, an initialization process of the internal state is carried out (STEP 301). More specifically, the information stored in main information history memory unit 112 and registered information memory unit 115 are cleared. The partial information assembly stored in partial information assembly memory unit 119 is set as the entire information stored in information memory unit 108. The information displayed as the initial main information and the information displayed as the initial sub-information are respectively set in main information display unit 105 and in sub-information display unit 106. A process similar to that of the sub-information select process (STEP 405) that will be described afterwards can be used to set the initial sub-information. Initialization can be effected to a state identical to that of the last state. In this case, the status of main information history memory unit 112, registered information memory unit 115, partial information assembly memory unit 119, main information display unit 105 and sub-information display unit 106 stored in an external memory device at the time when the previous process ends can be read in for initialization. Alternatively, the status of main information history memory unit 112, registered information memory unit 115, partial information assembly memory unit 119, main information display unit 105 and sub-information display unit 106 can be saved even after the end of the information retrieval method of the present invention taking advantage of a non-volatile memory.

The information set at main information display unit 105 is displayed on display device 103 (STEP 302). This process is identical to the process of STEP 102 at FIG. 2.

The information set at sub-information display unit 106 is displayed on display unit 103 with a color mark calculated at color calculation unit 109 (STEP 303). Similar to STEP 302, sub-information display unit 106 can supervise the index of the information to be displayed and read in the actual data of the information from memory device 201 at the time of display. The method of displaying information is similar to that for main information display unit 305. Information other than the sub-information stored in information memory unit 108 can be selected at random and displayed in addition to the sub-information.

Main information history display unit 113 provides the display of the information stored in main information history memory unit 112 on display device 103 (STEP 304). The information retrieval apparatus can provide the setting of display/non-display of the main information history. Execution of the present step can be omitted in the case of a non-display state.

Registered information display unit 116 provides the display of the information stored in registered information memory unit 115 on display device 103 (STEP 305). Setting can be provided for the display/non-display of the registered information. Execution of the present step can be omitted when in the non-display state.

Detailed information display unit 117 provides the display of the detailed information of the main information set in main information display unit 105 by referring to information memory unit 108 (STEP 306). The information retrieval apparatus can provide the setting of display/non-display of the detailed information. Execution of the present step can be omitted when in the non-display state.

Then, the event process is carried out (STEP 307). An event occurs in response to an entry from the user through input device 104 such as selection of displayed information using a pointing device such as a mouse, selection of a menu, and switching of various settings such as the display state by means of key entry, or in response to an interruption by timer 110. The details of the process of STEP 307 will be described afterwards.

Determination is made whether an event has occurred that ends the information retrieval process of the present invention at STEP 307 (STEP 308). When NO at STEP 308, control returns to STEP 302.

Figure 10:
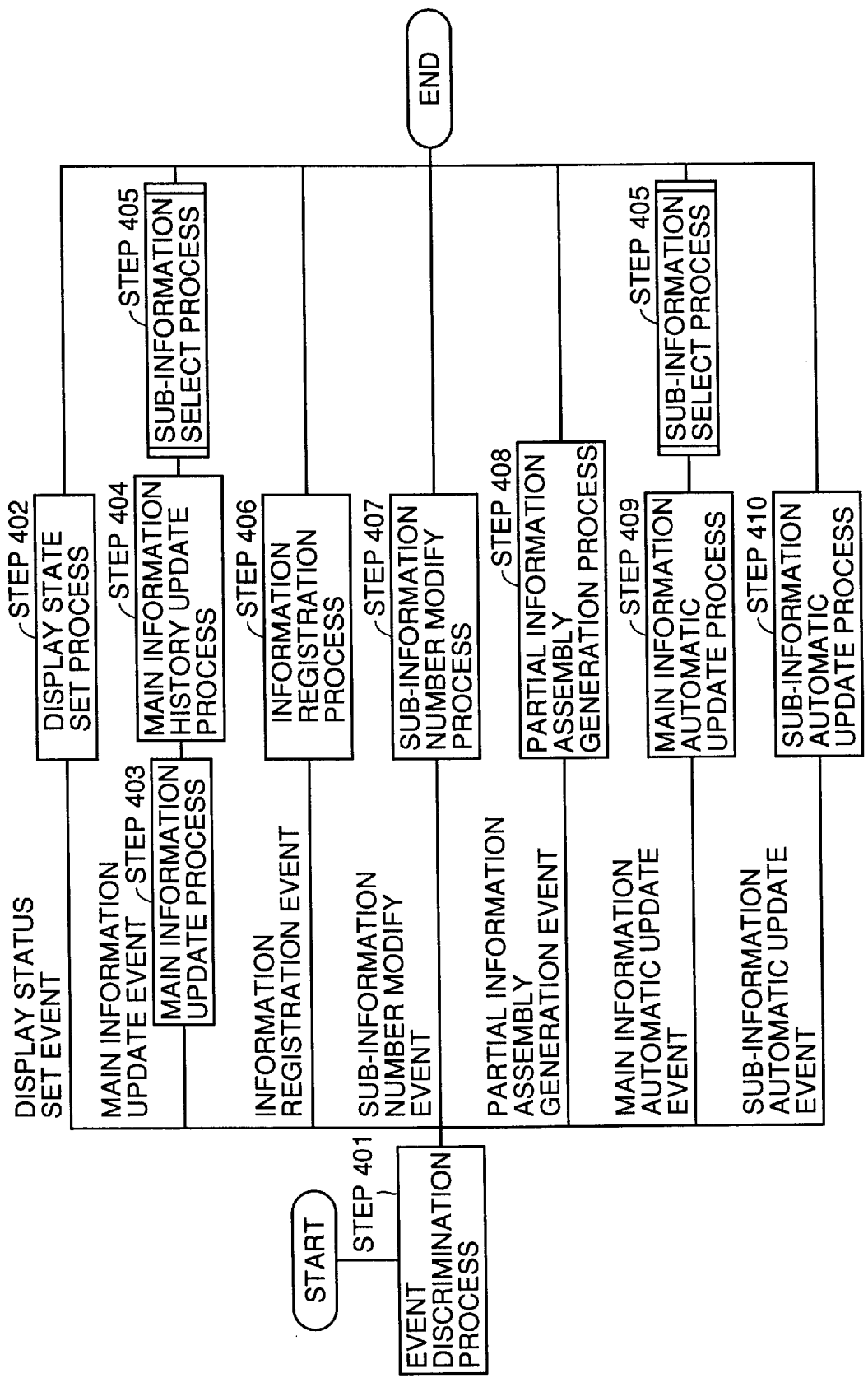
FIGS. 10 and 11 are flow charts showing the details of a process of another embodiment of the present invention.

The details of the process of STEP 307 of FIG. 9 will be described with reference to FIG. 10.

First, the generated event is discimined and the control is directed to a corresponding process (STEP 401). In general, an event occurs when the mouse or key button is depressed or released, or in response to an interruption by the timer. A basis event on a GUI (Graphical User Interface) component displayed on a screen is known as an event of a high level. For example, a button select event that occurs by depressing and releasing a mouse button on a button element is known. Also, the so-called drag operation is known. A mouse button is depressed to designate a certain information and dragged to a destination, whereat the depressed button is released. In this case, the contents of the series of events are interpreted to determine a corresponding process. These events and the contents to be processed do not necessarily have to be in a one-to-one correspondence. For example, the event that occurred in response to the selection of a "main information detailed information display" menu and the event that occurred in response to depression of key "I" on the keyboard can both correspond to the setting process of displaying the detailed information of the main information at STEP 306 in FIG. 9.

When an event is identified that is related to the setting of a display state such as display/non-display of the main information history, display/non-display of the registered information, display/non-display of the detailed information of the main information, setting/cancel of the automatic update process of the main information, or the setting/cancel of the automatic update process of the sub-information, respective corresponding flags are set/unset by the display status set process of STEP 402. The flag of the display/non-display state is referred to prior to the actual execution of respective display processes. The process is executed when the flag is set, and not executed when the flag is unset. When the event corresponds to the set/cancel of the automatic update process, the information retrieval apparatus enables interruption by the timer when the automatic update process is set and disables interruption by the timer when the automatic update process is canceled.

When an event of updating the main information is identified at STEP 401, the main information under control of main information display unit 105 is updated to the new main information (STEP 403). Information of the new main information is added to the end of the history of the main information stored in main information history memory unit 112 (STEP 404). Then the sub-information under control of sub-information display unit 106 is updated (STEP 405). The details of the sub-information select process of STEP 405 will be described afterwards.

When an event of selecting and adding to the registered information that displayed information is identified at STEP 401, the selected information is added to the registered information stored in registered information memory unit 115 (STEP 406).

When the event of altering the number of sub-information is identified at STEP 401, the number of sub-information displayed at sub-information display unit 106 is altered (STEP 407).

When the event of generating a partial information assembly by an operation such as execution of the narrow down retrieval function is identified at STEP 401, partial information assembly generation unit 118 generates a partial information assembly according to the generated event from the information stored in information memory unit 108. The generated partial information assembly is stored in partial information assembly memory unit 119 (STEP 408).

When the main information automatic update event due to an interruption caused by the timer is identified at STEP 401, one of the sub-information is selected at random and set as the next main information (STEP 409). The sub-information is updated corresponding to the new main information (STEP 405).

When the sub-information automatic update event due to an interruption caused by the timer is identified at STEP 401, one to all the sub-information displayed are exchanged with the information not selected as the sub-information out the information stored in partial information assembly memory unit 119 and set as the new sub-information (STEP 410).

The details of the process of STEP 405 of FIG. 10 will be described hereinafter with reference to FIG. 11.

First, counter i is initialized to 1 (STEP 501). The i-th information out of information stored in partial information assembly memory unit 119 is acquired (STEP 502). The relationship level between the main information and the i-th information acquired at STEP 502 is calculated and stored in the set with the value of i (STEP 503). The calculation of the level of relationship is similar to that of the process of STEP 203 of FIG. 3. Therefore, the description thereof will not be repeated.

Then, counter j is initialized to 1 (STEP 504). The j-th information of all the information stored in registered information memory unit 115 is acquired (STEP 505). The level of relationship between the j-th registered information acquired at STEP 505 and the i-th information acquired at STEP 502 is calculated, and stored in the set with the value of i (STEP 506). Calculation of the relationship level is similar to that of the process of STEP 503.

Then, the value of j is incremented by 1 (STEP 507). Determination is made whether the value of j is greater than the number of registered information stored in registered information memory unit 115 (STEP 508). When the value of j is greater than the number of registered information (YES at STEP 508), control proceeds to STEP 509. Otherwise (NO at STEP 508), the process of STEPs 505–508 is repeated.

The relationship levels calculated at STEPs 503 and 506 are applied weight and added to be stored as the relationship level of the i-th information together with the set of the value of i (STEP 509). For example, relationship level $\alpha_i$ of the i-th information is calculated by the following equation.

$$\alpha_i = w_m \alpha_{i,m} + \frac{w_r}{n} \sum_{j=1}^{n} \alpha_{i,j}$$

where $W_m$ is the weighting coefficient of the relationship level with respect to the main information, $\alpha_{i,m}$ is the relationship level between the i-th information and the main information, $W_r$ is the weighting coefficient of the relationship level for the registered information, n is the number of registered information, and $\alpha_{i,j}$ is the relationship level between the i-th information and the j-th registered information.

A color corresponding to the relationship level calculated at STEP 509 is calculated at color calculation unit 109 and stored corresponding to the value of i (STEP 510). For example, when the red component $C_r$, green component $C_g$, and the blue color component $C_b$ are set to be $$C_r = C_g = C_b = 1 - \alpha$$

for the relationship level $\alpha$ of $0 \leq \alpha \leq 1$, the color becomes darker as the relationship level becomes higher. In contrast, the color becomes lighter as the relationship level becomes lower.

Then, the value of i is incremented by 1 (STEP 511). Determination is made whether the value of i is greater than the number of all the information stored in partial information assembly memory unit 119 (STEP 512). When the value of i is greater than the number of information stored in partial information assembly memory unit 119 (YES at STEP 512), control proceeds to STEP 513. Otherwise, (NO at STEP 512), the process of STEPs 502–512 is repeated.

The relationship level stored at STEP 503 is sorted in the descending order (STEP 513). The value of i stored correspondingly is also sorted. Therefore, the entire information stored in partial information assembly memory unit 119 is stored in the order related to the main information and the registered information. The information corresponding to the sorted order at STEP 513 is set in sub-information display unit 106 (STEP 514). Here, the set information can be limited to the number of the information to be displayed in sub-information display unit 106. Alternatively, all the information for the subsequent modification of the number of displays can be set. Furthermore, the display position and size can be altered according to the level of the relationship.

An example of retrieval according to the information retrieval method of the present embodiment will be described with reference to FIGS. 12–17.

Figure 12:
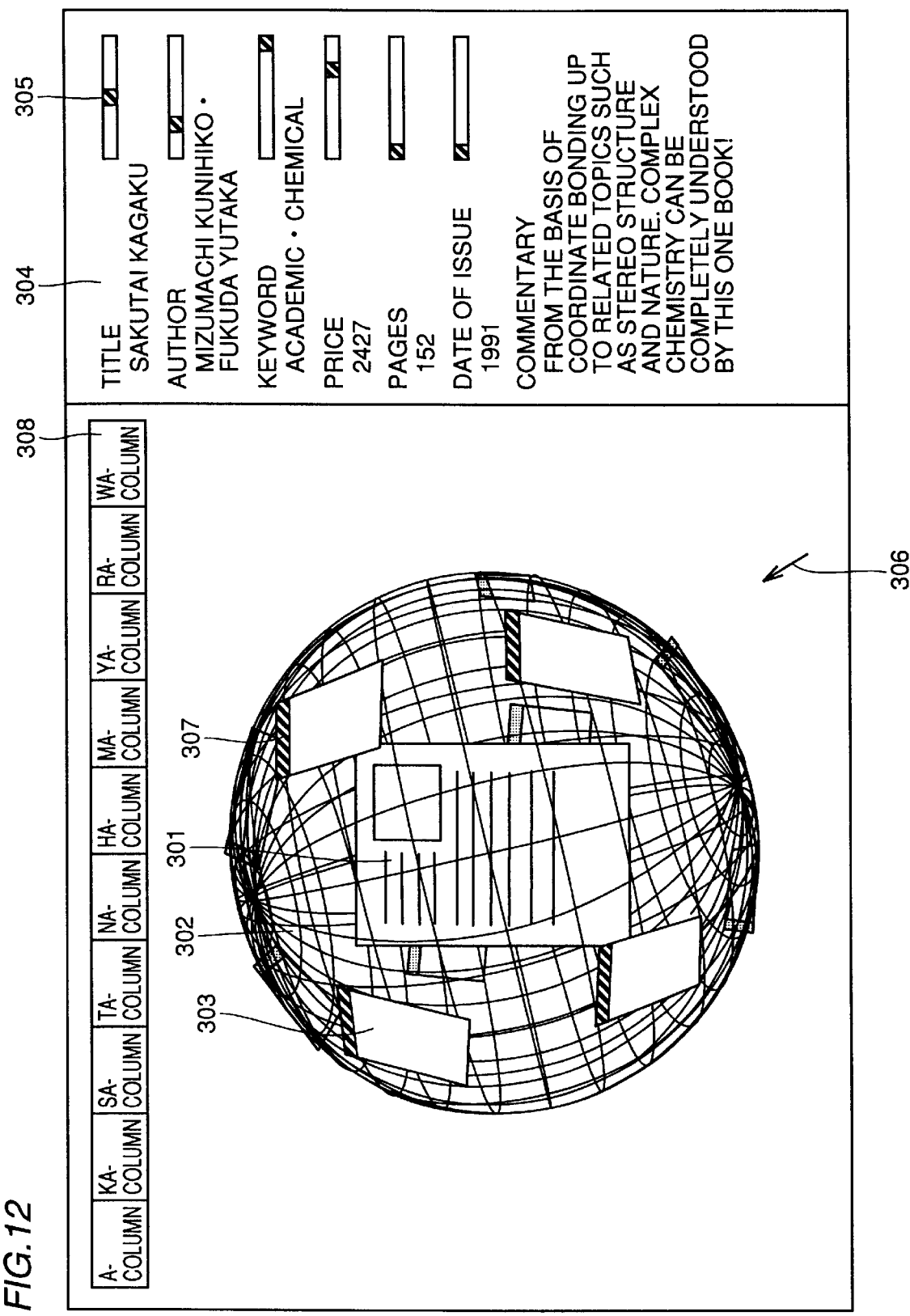
FIGS. 12 and 13 show examples of display according to another embodiment of the present invention.

FIG. 12 shows an example of the display screen. Main information 301 is displayed at the center of the screen. Sub-information 303 is affixed on a virtual sphere 302 centered about the main information in a three-dimensional manner. The operation of virtual sphere 302 and the display format of sub-information 303 are similar to those described with reference to FIG. 5. Therefore, description thereof will not be repeated.

Detailed information 304 of main information 301 is displayed at the right side of the screen. In the example of FIG. 12, the data used to calculate the relationship level such as the title, author, the keyword and the like are also displayed. A GUI component 305 to set the weight contributing to the relationship level is displayed for each type of data. The user operates cursor 306 on the screen using a pointing device such as a mouse to alter the weight value through GUI component 305. The usage of the weight value is as described before in association with the calculation of the relationship level. Although the detailed information is displayed in an additional region in FIG. 12, the detailed information can be displayed in an overlapping manner on the region where the main information and the sub-information are displayed taking advantage of the feature such as the semi-transparent display and the like.

A color mark 307 corresponding to respective relation levels is displayed at sub-information 303. A menu 308 to narrow down the range of information that becomes the subject of display is provided at the upper portion of the display screen. In response to selection of this menu by the user, the event of generating a partial information assembly from the information of titles starting from a corresponding column of the Japanese syllabary occurs, whereby STEP 407 of FIG. 10 is executed. As a result, the information displayed as sub-information 303 is limited to information having a title starting from the selected column of the Japanese syllabary.

Figure 13:
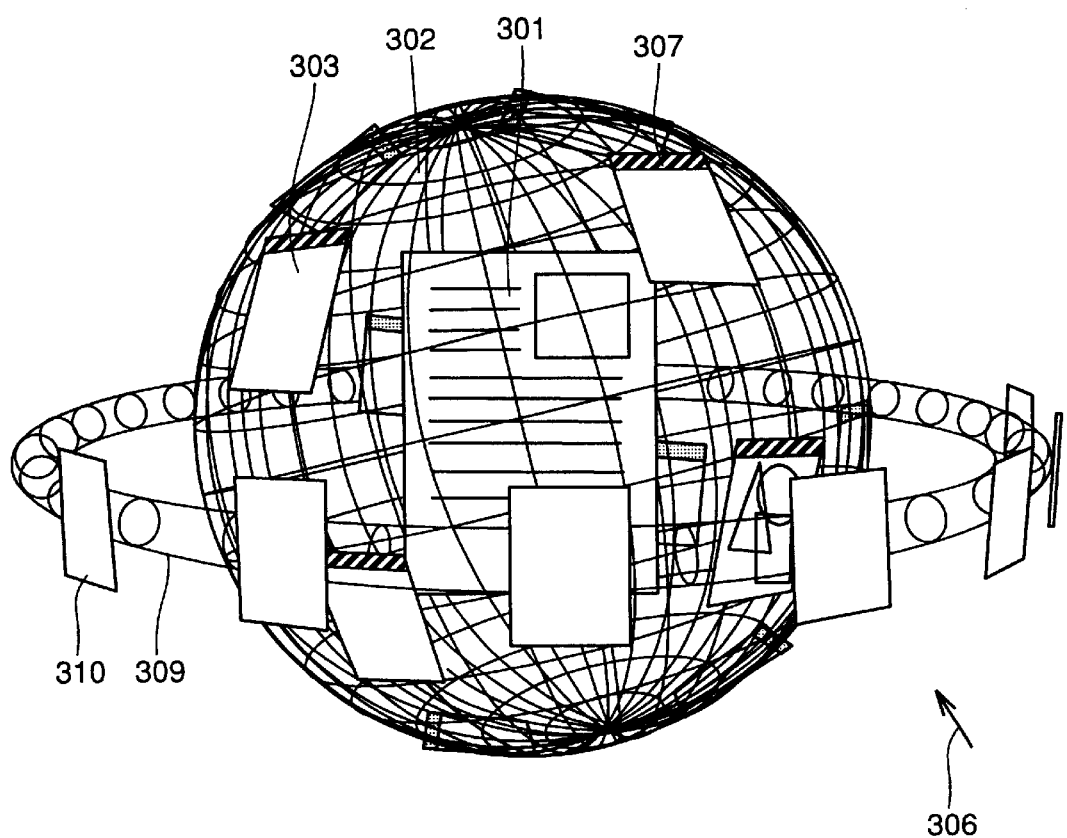

FIG. 13 shows a portion of another display screen. Referring to FIG. 13, information is displayed in a three-dimensional manner with main information history 310 stored in main information history memory unit 112 affixed on a virtual ring 309 in addition to the display of FIG. 12. By rotating virtual ring 309 by means of input device 104, the displayed main information history 310 can be moved to a position for better visuality. A trackball can be used for the input device 104. In this case, the rotation of the trackball corresponds to the rotation of virtual ring 309. Alternatively, a keyboard can be employed as input device 104. Virtual ring 309 can be rotated by a constant angle in the direction of a depressed cursor key on the keyboard. Further alternatively, a pointing device such as a mouse can be used. Cursor 306 on the screen is moved to designate a certain point on virtual ring 309 and dragged to a destination, resulting in rotation of virtual ring 309. Also, by allowing modification of the display interval of main information history 310, many more information of history can be viewed at one time by reducing the display interval. By increasing the display interval, main information 301 or sub-information 303 displayed at the back area can be brought to a state of better visuality.

In FIG. 13, main history information 310 is displayed. The registered information can also be displayed in a similar way. If the user rotates virtual sphere 302 at a rotary speed lower than a predetermined threshold value, virtual sphere 302 can be displayed in a manner automatically continuing its rotation at the same rotary speed. This provides the advantage that sub-information 303 displayed at the backside of virtual sphere 302 is subsequently shifted to a location desirable for better visualization automatically by just looking at the rotating virtual sphere 302. In general, sub-information 303 located in the proximity of the axis of rotation of virtual sphere 302 is seldom brought to an observable position. By applying a precession motion to alter the direction of the axis of rotation, the location will change to a position desirable for better visualization. Alternatively, the axis of rotation can be altered at every constant period of time.

It is assumed that the automatic update process of the sub-information is set when automatic rotation is effected. Display is provided so that one of displayed sub-information 303 is exchanged at every constant period of time with one of the information stored in partial information assembly memory unit 119 and not yet selected as the sub-information.

Figure 14:
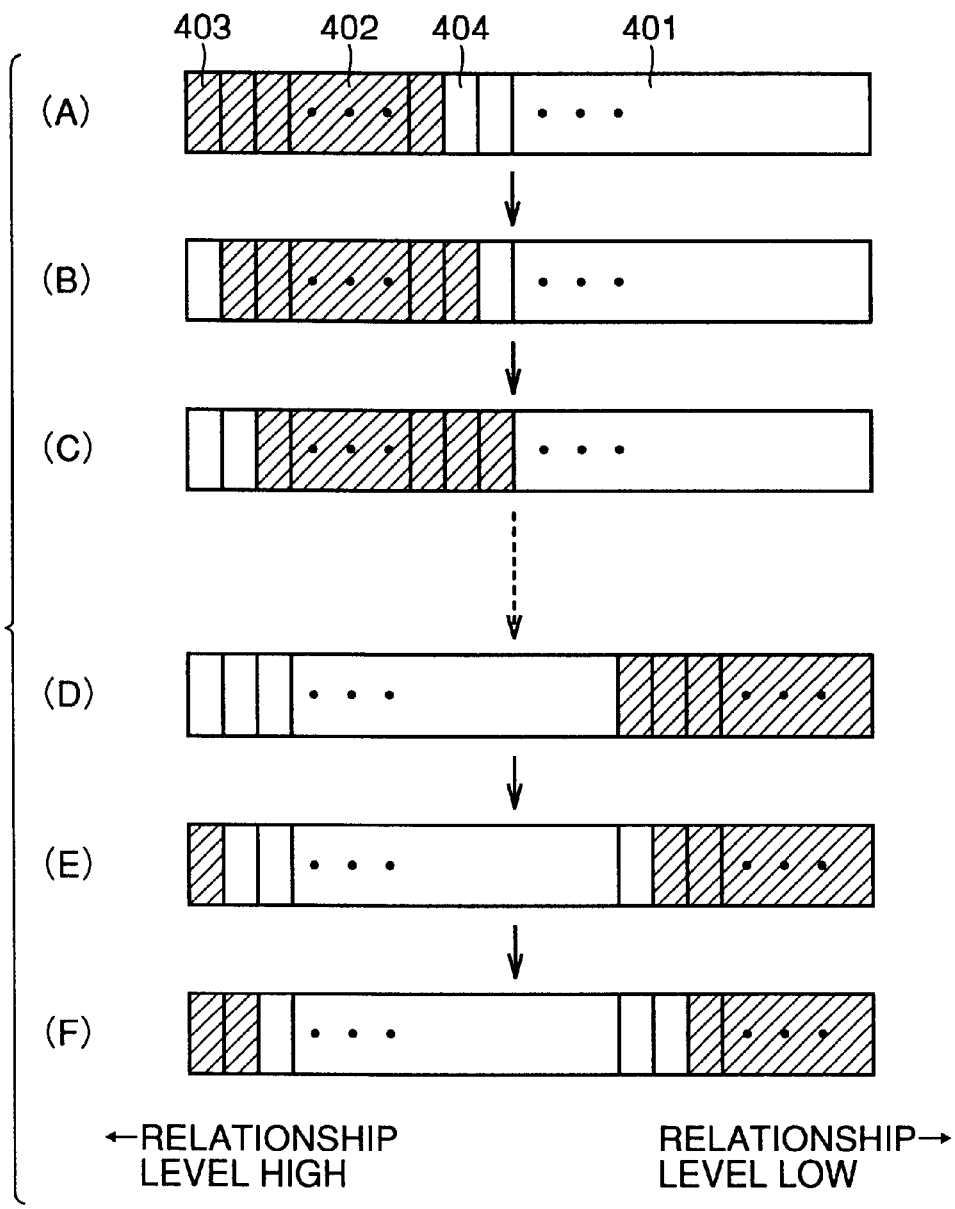
FIG. 14 is a diagram to describe replacement of sub-information in another embodiment of the present invention.

The sub-information automatic update process will be described with reference to FIG. 14. Referring to (A) in FIG. 14, partial information assembly 401 is sorted in the order of the relationship level with the main information. The hatched portion 402 of the higher relationship level at the left side is displayed as the sub-information. From this state, information 403 having the highest relationship level in portion 402 that is currently displayed as the sub-information is replaced with information 404 having the next highest relationship level with respect to portion 402 to result in the state of (B). The next sub-information can further be replaced in a similar manner to result in the state of (C). By repeating replacement of the sub-information in such a manner, the sub-information of the highest relationship level is automatically replaced and displayed according to the order of the relationship level. When there is no more information of a relationship level lower than that of the sub-information displayed in partial information assembly 401 as shown in (D), the information having the highest relationship level can be displayed again (FIG. 14(E), (F)).

Figure 15:
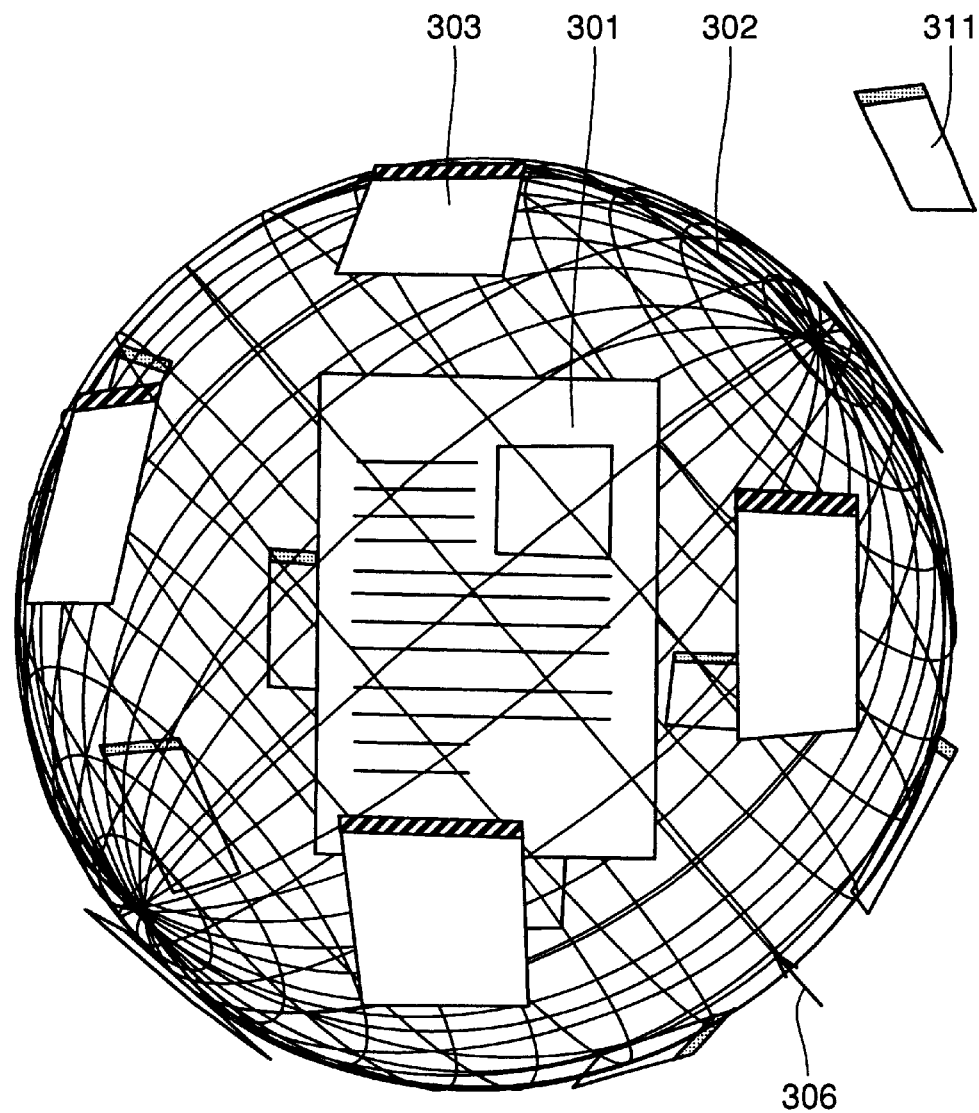
FIGS. 15, 16 and 17 show examples of display of another embodiment of the present invention.

The state of replacing one sub-information 303 will be described with reference to FIG. 15. Animation display is provided so that sub-information 311 to be replaced falls off from virtual sphere 302 towards outside the screen, and the replaced information moves from outside the screen to be affixed onto virtual sphere 302. The user is notified of the replacement of sub-information 303 by this animation display. When the user stops the rotation of virtual sphere 302, the sub-information automatic update process is cancelled.

Figure 11:
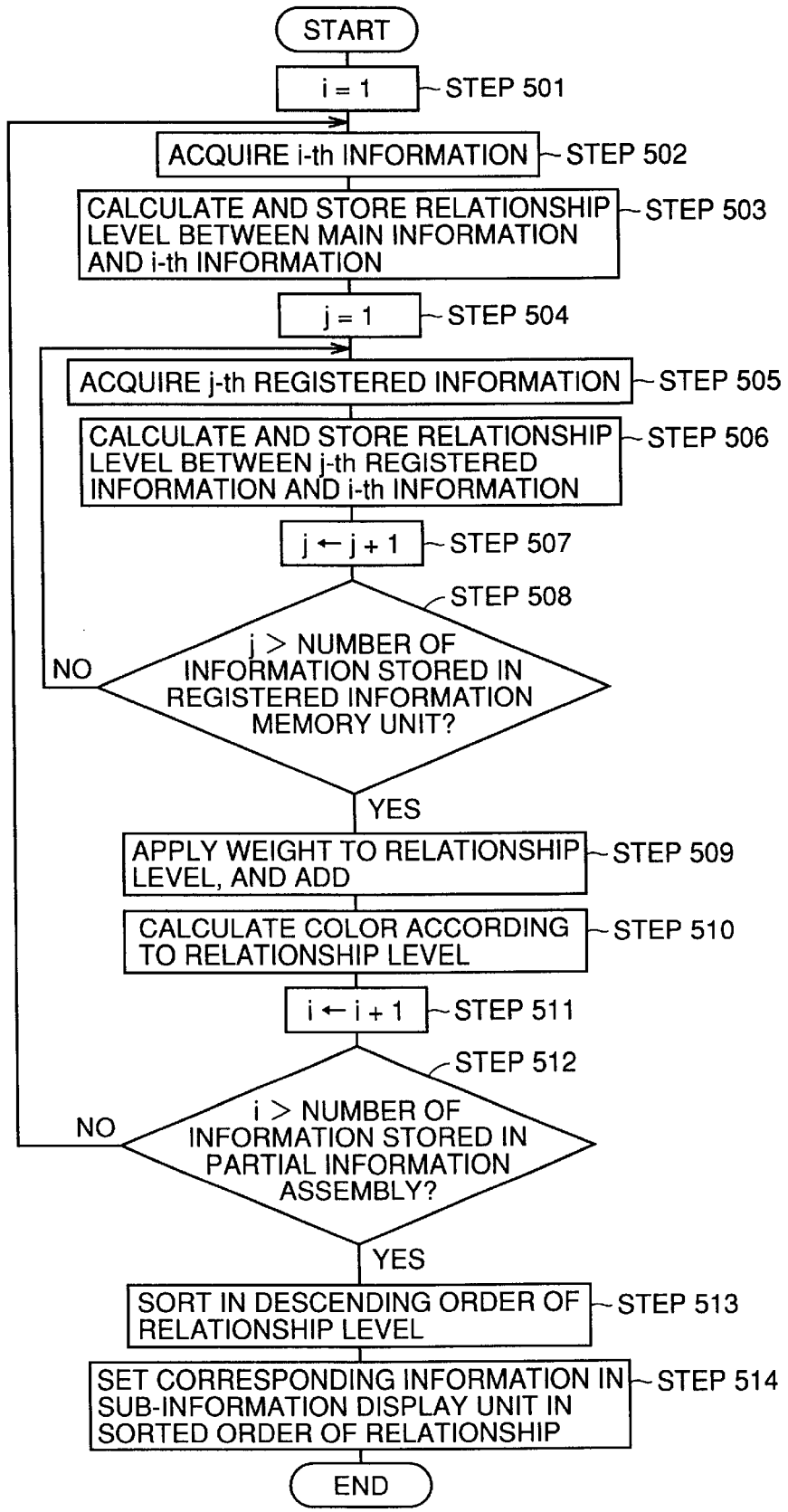

When the user rotates virtual sphere 302 at a rotary speed exceeding a threshold value, the sub-information select process described with reference to FIG. 11 is carried out using the currently set weight contributing to the relationship level for each type of data. The relationship level between the main information and the information stored in partial information assembly 401 is recalculated. The sub-information under control of sub-information display unit 106 is updated.

Figure 16:
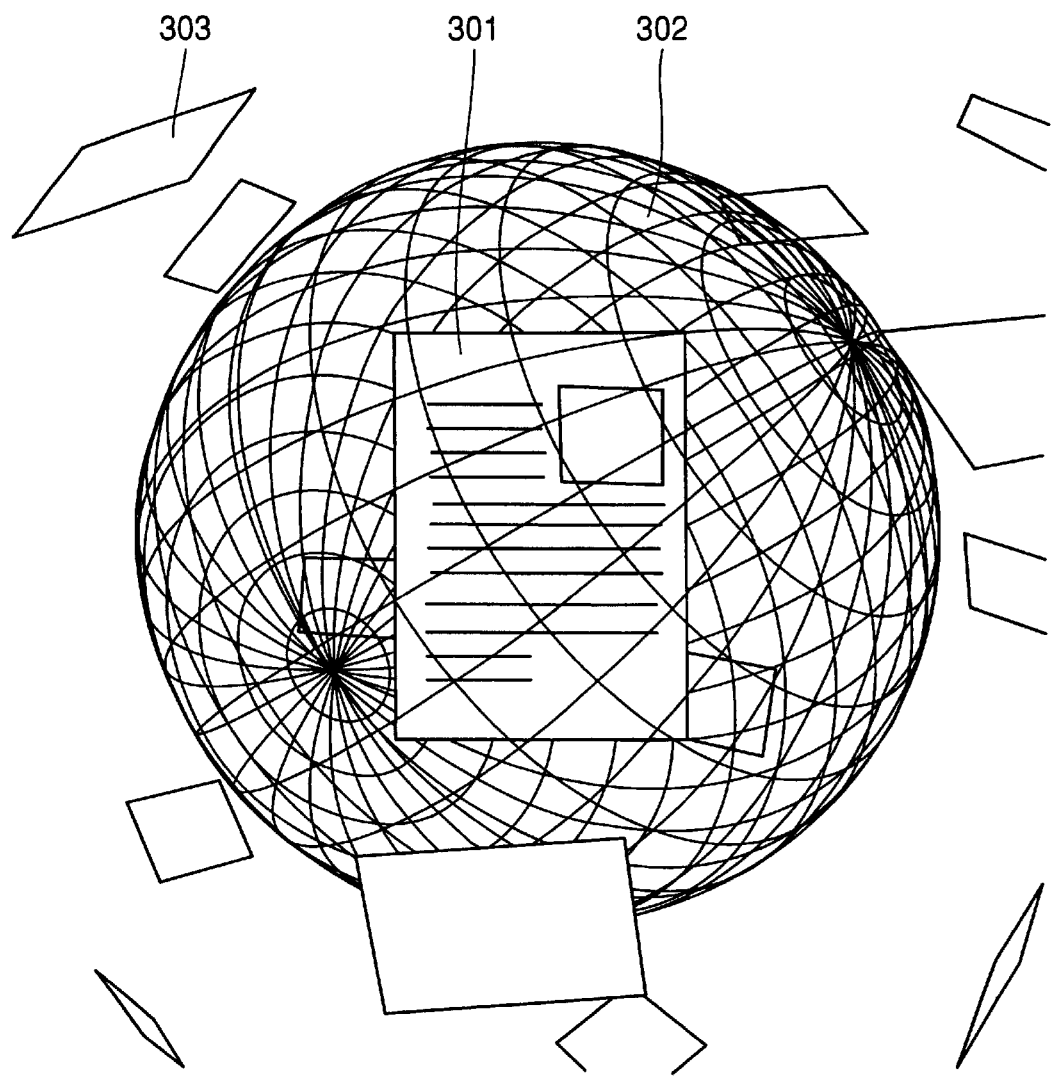

FIG. 16 corresponds to this operation. All sub-information 303 prior to update fall off from a virtual sphere 302 to move outside the screen. Following recalculation of the relationship level and update of the sub-information under control of sub-information display unit 106, the updated sub-information moves from outside the screen onto virtual sphere 302. By this animation display, the user is notified of sub-information 303 being updated.

Figure 17:
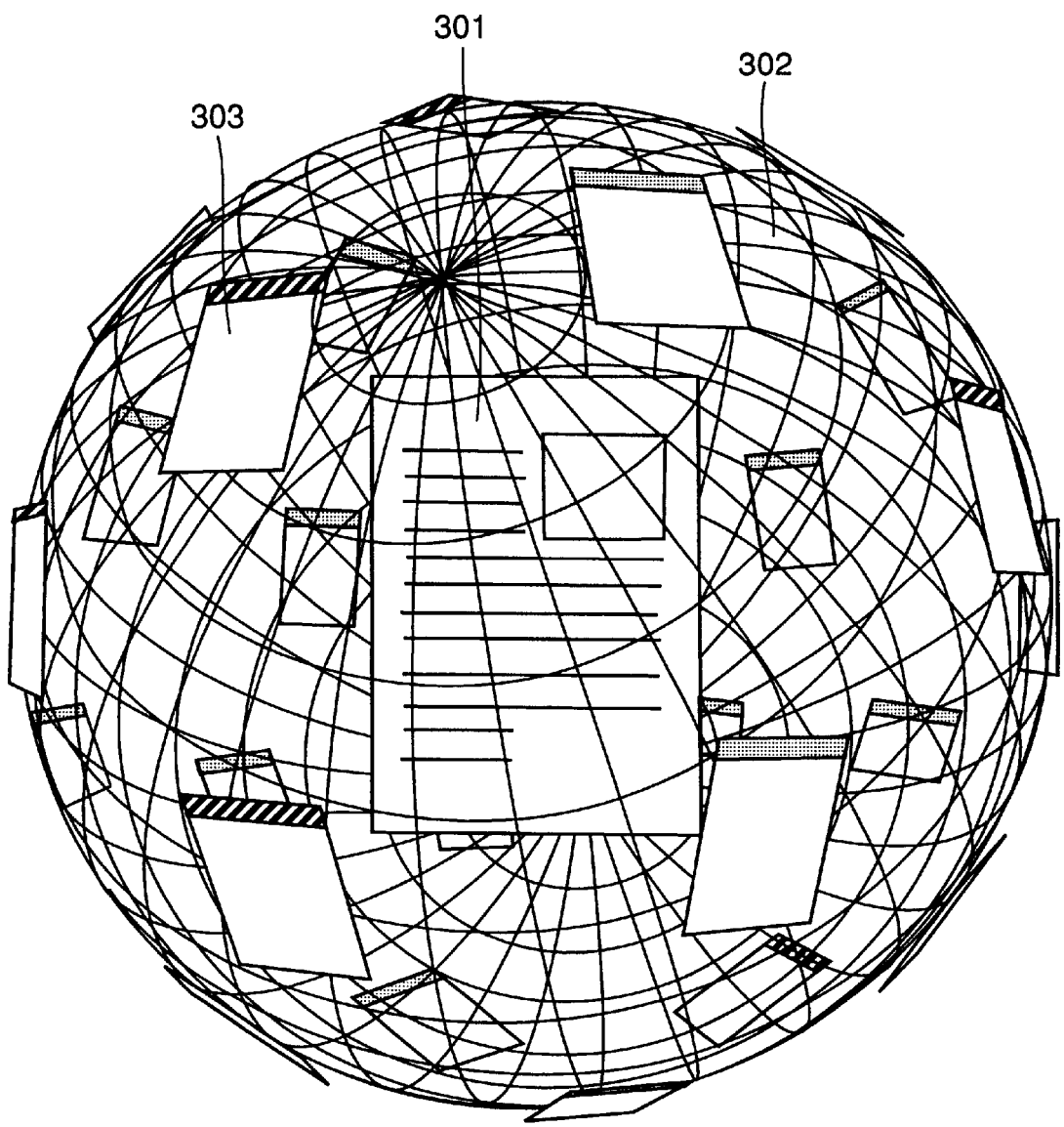
Figure 19:
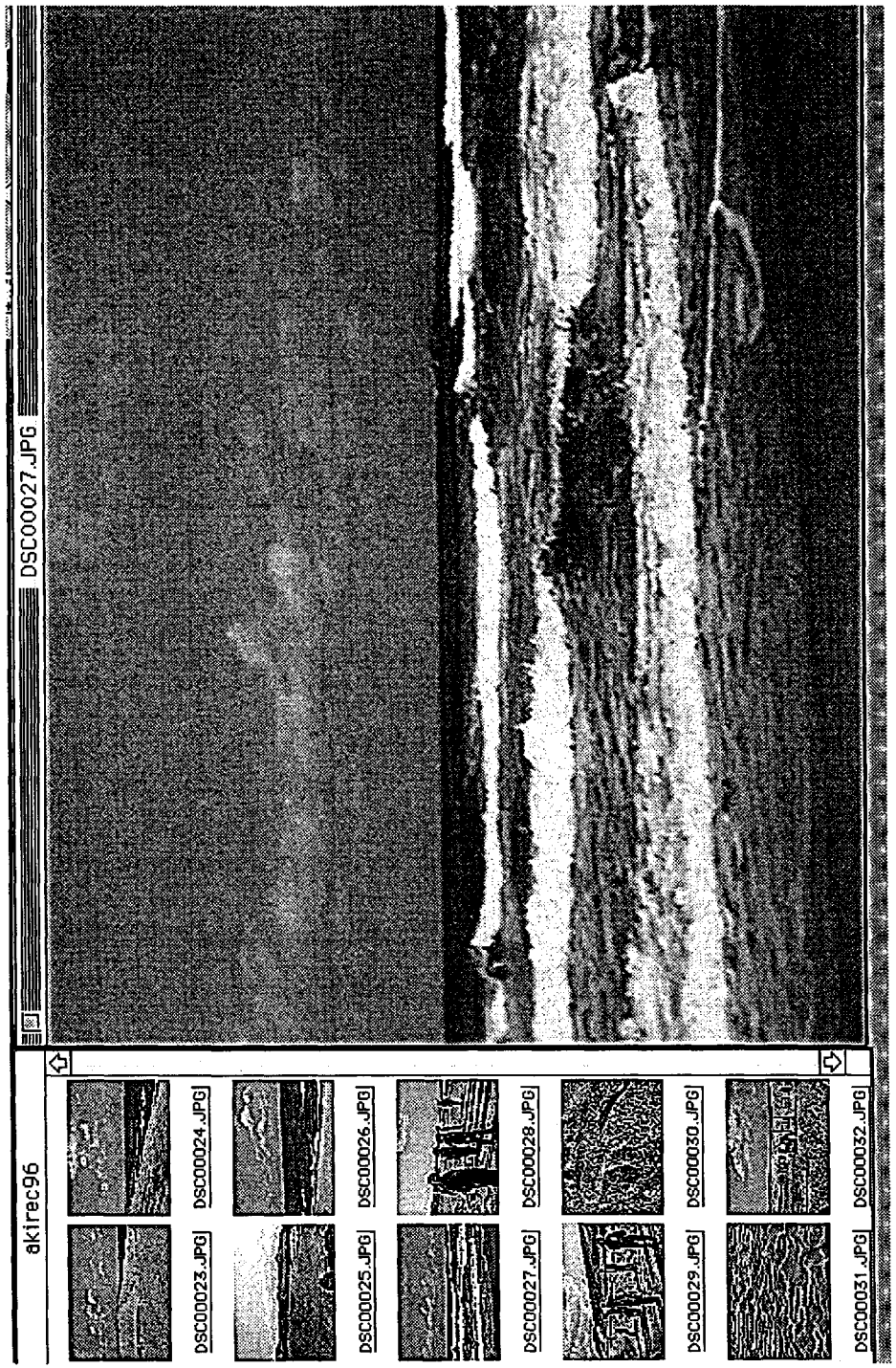

FIG. 17 corresponds to the case where the number of sub-information to be displayed is increased from the state of FIG. 12 by the operation of altering the number of sub-information. The radius of virtual sphere 302 is increased. The size of each sub-information 303 to be displayed is reduced. Accordingly, recognition is facilitated that the number of displayed sub-information is altered.

According to the information retrieval method of the second embodiment, information related to the information of interest is also displayed. The user selects the information suiting his/her taste therefrom. When the accepted information is replaced as the main information, the related information is also updated. Thus, the user can browse through the information by following the preferred information even in the case where his/her idea of the information to be retrieved is not yet definite.

The level of relationship with the main information is represented by the color, the brightness, or the location of the displayed information or size. Therefore, the user can identify in an intuitive way the level of relationship between the main information and other information.

In addition to the information related to the main information, information selected at random can also be displayed. Therefore, the user is provided of the possibility of finding information suiting his/her taste from unexpected information.

One of the sub-information is replaced for every constant period of time as the main information to be displayed. Therefore, the user can view the display of relating information without intentionally manipulating the input device. The user can resume with the operation when an appropriate information is displayed to continue the retrieval.

The user can alter the number of information displayed as the sub-information. Therefore, the user can have the related information displayed in an expanded manner while confirming the contents or reducing the display of many related images to find a desired one out from the many information.

The user can alter the display position of the information provided as the sub-information by an input manipulation of the rotation. Therefore, the user can move the sub-information to a location desirable for better visualization to facilitate information retrieval.

Information displayed as the sub-information is automatically replaced and updated. Therefore, the user can find information approximating his/her desired information from the information that is automatically displayed without intentional operation of the input device. Thus, retrieval of the desired information is further facilitated.

The information displayed as the main information is sequentially stored. Since the user can review the update history, information once viewed can be called up again easily.

Information related to the information previously viewed by the user can be displayed as the sub-information. Therefore, information suiting the user's preference can be displayed.

Information of interest out of the displayed information can be stored as registered information. Therefore, the user can carry out another retrieval with the information of interest temporarily saved during the retrieval process. The saved information can be compared during the retrieval. Also, retrieval can be commenced from the saved information.

The information registered as the information of interest and information related thereto are displayed in a sub-display region. The user is presented of an image suiting his/her taste.

Information narrowed down according to a predetermined condition can be set as the subject of display from all the information stored in the memory device. The user can employ the retrieval method of the present invention after restricting the information that becomes the subject of retrieval using a conventional retrieval method with respect to an explicit retrieval condition. Therefore, retrieval can be carried out more effectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information retrieval method for retrieving information from a memory device in which a plurality of information are stored, comprising:

determining whether any information from a predetermined number of displayed sub-information is selected, when any of said sub-information is selected, setting the selected information as main information, when any of said sub-information is selected, calculating a relationship level with said main information for each information other than said main information stored in said memory device, wherein the relationship level is calculated for each information other than said main information using at least one characteristic of the information and at least one characteristic of the main information, and selecting said predetermined number of sub-information according to said relationship level, displaying said main information, and displaying said predetermined number of sub-information.

2. The information retrieval method according to claim 1, wherein selecting said predetermined number of sub-information comprises calculating the relationship level with said main information for each information stored in said memory device other than said main information, calculating a value of a color corresponding to said level relationship, and selecting said predetermined number of sub-information according to said relationship level, wherein displaying said predetermined number of sub-information comprises applying a color representing the relationship level of said sub-information to each said predetermined number of sub-information for display.

3. The information retrieval method according to claim 1, wherein selecting said predetermined number of sub-information comprises calculating the relationship level with said main information for each information stored in said memory device other than said main information, calculating a display position of said sub-information according to said relationship level, and selecting said predetermined number of sub-information according to said relationship level, wherein displaying said predetermined number of sub-information comprises displaying each said predetermined number of sub-information at said calculated display position according to said relationship level.

4. The information retrieval method according to claim 1, wherein selecting said predetermined number of sub-information comprises calculating the relationship level with said main information for each information stored in said memory device other than said main information, calculating a display size of said sub-information according to said relationship level, and selecting said predetermined number of sub-information according to said relationship level, wherein displaying said predetermined number of sub-information comprises displaying each said predetermined number of sub-information in a display size associated with said relationship level.

5. The information retrieval method according to claim 1, wherein displaying said predetermined number of sub-information comprises selecting at random and displaying information stored in said memory device other than said main information and said predetermined number of sub-information, together with said predetermined number of sub-information.

6. The information retrieval method according to claim 1, further comprising:

selecting any of said displayed predetermined number of sub-information at random for every predetermined time and setting the selected information as new main information, and calculating the relationship level with said main information for each information stored in said memory device other than said main information, and selecting said predetermined number of sub-information according to said relationship level.

7. The information retrieval method according to claim 1, further comprising altering the number of said sub-information to be displayed according to a requirement, wherein displaying said predetermined number of information comprises displaying an altered number of sub-information.

8. The information retrieval method according to claim 1, wherein displaying said predetermined number of sub-information comprises receiving a rotation amount and displaying said predetermined number of sub-information rotated by said rotation amount.

9. The information retrieval method according to claim 1, further comprising selecting a portion of information stored in said memory device other than said main information and said predetermined number of sub-information for every predetermined time, and replacing the selected information for a part of said predetermined number of sub-information to update said predetermined number of sub-information.

10. The information retrieval method according to claim 1, further comprising:

storing history of said main information, and displaying main information displayed to date according to said history.

11. The information retrieval method according to claim 1, further comprising registering selected information out of the main information and sub-information displayed.

12. The information retrieval method according to claim 11, further comprising displaying the registered information.

13. The information retrieval method according to claim 1, further comprising displaying detailed information of said main information displayed.

14. The information retrieval method according to claim 1, further comprising generating a partial information assembly of information matching a predetermined condition from the information stored in said memory device.

15. A computer-readable recording medium recorded with a program of an information retrieval method retrieving information from a memory device in which a plurality of information are stored, said information retrieval method comprising:

determining whether any information of a predetermined number of sub-information is selected displayed, when any of said sub-information is selected, setting the selected information as main information, when any of said sub-information is selected, calculating a relationship level with said main information for each information other than said main information stored in said memory device, wherein the relationship level is calculated for each information other than said main information using at least one characteristic of the information and at least one characteristic of the main information, and selecting said predetermined number of sub-information according to said relationship level, displaying said main information, and displaying said predetermined number of sub-information.

16. The computer-readable recording medium according to claim 15, wherein selecting said predetermined number of sub-information comprises calculating the relationship level with said main information for each information stored in said memory device other than said main information, calculating a value of a color corresponding to said level relationship, and selecting said predetermined number of sub-information according to said relationship level, wherein displaying said predetermined number of sub-information comprises the step of applying a color representing the relationship level of said sub-information to each said predetermined number of sub-information for display.

17. The computer-readable recording medium according to claim 15, wherein said step of selecting said predetermined number of sub-information comprises calculating the relationship level with said main information for each information stored in said memory device other than said main information, calculating a display position of said sub-information according to said relationship level, and selecting said predetermined number of sub-information according to said relationship level, wherein displaying said predetermined number of sub-information comprises the step of displaying each said predetermined number of sub-information at said calculated display position according to said relationship level.

18. The computer-readable recording medium according to claim 15, wherein selecting said predetermined number of sub-information comprises calculating the relationship level with said main information for each information stored in said memory device other than said main information, calculating a display size of said sub-information according to said relationship level, and selecting said predetermined number of sub-information according to said relationship level, wherein displaying said predetermined number of sub-information comprises displaying each said predetermined number of sub-information in a display size associated with said relationship level.

19. The computer-readable recording medium according to claim 15, wherein displaying said predetermined number of sub-information comprises selecting at random and displaying information stored in said memory device other than said main information and said predetermined number of sub-information, together with said predetermined number of sub-information.

20. The computer-readable recording medium according to claim 15, said information retrieval method further comprising:

selecting any of said displayed predetermined number of sub-information at random for every predetermined time and setting the selected information as new main information, and calculating the relationship level with said main information for each information stored in said memory device other than said main information, and selecting said predetermined number of sub-information according to said relationship level.

21. The computer-readable recording medium according to claim 15, said information retrieval method further comprising altering the number of said sub-information to be displayed according to a requirement, wherein displaying said predetermined number of information comprises displaying an altered number of sub-information.

22. The computer-readable recording medium according to claim 15, wherein displaying said predetermined number of sub-information comprises receiving a rotation amount and displaying said predetermined number of sub-information rotated by said rotation amount.

23. The computer-readable recording medium according to claim 15, said information retrieval method further comprising selecting a portion of information stored in said memory device other than said main information and said predetermined number of sub-information for every predetermined time, and replacing the selected information for a part of said predetermined number of sub-information to update said predetermined number of sub-information.

24. The computer-readable recording medium according to claim 15, said information retrieval method further comprising:

storing history of said main information, and displaying main information displayed to date according to said history.

25. The computer-readable recording medium according to claim 15, said information retrieval method further comprising registering selected information out of the main information and sub-information displayed.

26. The computer-readable recording medium according to claim 25, said information retrieval method further comprising displaying the registered information.

27. The computer-readable recording medium according to claim 15, said information retrieval method further comprising displaying detailed information of said main information displayed.

28. The computer-readable recording medium according to claim 15, said information retrieval method further comprising generating a partial information assembly of information matching a predetermined condition from the information stored in said memory device.

29. An information retrieval apparatus comprising:
- a memory device of a plurality of information including main information and a predetermined number of sub-information,
- a display device of said main information and said predetermined number of sub-information,
- an input device receiving designation from a user,
- a relationship level calculation unit connected to said memory device to calculate a relationship level with said main information for each of said plurality of information other than said main information, wherein the relationship level is calculated for each information other than said main information using at least one characteristic of the information and at least one characteristic of the main information,
- a sub-information display unit connected to said relationship level calculation unit, said memory device and said display device to select and display said predetermined number of sub-information out from said plurality of information other than said main information according to said relationship level, and
- a main information display unit connected to said input device, said memory device and said display device to detect selection of any of said predetermined number of sub-information to set the selected sub-information as new main information and displaying said main information.

30. The information retrieval apparatus according to claim 29, further comprising a color calculation unit connected to said relationship level calculation unit to calculate a value of a color corresponding to said relationship level,
wherein said sub-information display unit comprises a colored sub-information display unit connected to said relationship level calculation unit, said memory device, said display device and said color calculation unit to select said predetermined number of sub-information out from said plurality of information other than said main information to apply and display a color representing the relationship level of said sub-information according to said relationship level.

31. The information retrieval apparatus according to claim 29, wherein said sub-information display unit comprises
- a display position calculation unit connected to said relationship level calculation unit to calculate a display position of said sub-information according to said relationship level, and
- a device connected to said display position calculation unit, said relationship level calculation unit, said memory device and said display device to select said predetermined number of sub-information from said plurality of information other than said main information, and displaying the selected sub-information at a calculated display position according to the relationship level of said sub-information.

32. The information retrieval apparatus according to claim 29, wherein said sub-information display unit comprises
- a display size calculation unit connected to said relationship level calculation unit to calculate a display size of said sub-information according to said relationship level, and
- a device connected to said display size calculation unit, said relationship level calculation unit, said memory device and said display unit to select said predetermined number of sub-information from said plurality of information other than said main information, and displaying the selected sub-information at a calculated display size according to the relationship level of said sub-information.

33. The information retrieval apparatus according to claim 29, wherein said sub-information display unit comprises
- a first device connected to said relationship level calculation unit, said memory device and said display device to select said predetermined number of sub-information from said plurality of information other than said main information, and
- a second device connected to said first device, said memory device and said display device to select at random and display information other than the selected sub-information from said memory device.

34. The information retrieval apparatus according to claim 29, further comprising a timer,
wherein said sub-information display unit comprises
- a first device connected to said relationship level calculation unit, said memory device and said display device to select and display said predetermined number of sub-information out from said plurality of information other than said main information according to said relationship level, and
- a second device connected to said first device, said timer and said memory device to select any of said predetermined number of sub-information for every predetermined time and setting the selected sub-information as the main information.

35. The information retrieval apparatus according to claim 29, further comprising a sub-information number set unit connected to said input device to set the number of said sub-information to be displayed,
wherein said sub-information display unit comprises a device connected to said sub-information number set unit, said relationship level calculation unit, said memory device and said display device to select said number of sub-information set at said sub-information number set unit from the plurality of information other than said main information according to said relationship level.

36. The information retrieval apparatus according to claim 29, wherein said sub-information display unit comprises
- a sub-information select unit connected to said relationship level calculation unit and said memory device to select said predetermined number of sub-information from said plurality of information other than said main information according to said relationship level, and a sub-information rotation display unit connected to said sub-information select unit, said display device and said input device to receive a rotation amount input through said input device to rotate said predetermined number of sub-information by said rotation amount for display.

37. The information retrieval apparatus according to claim 29, further comprising a timer, wherein said sub-information display unit comprises a device connected to said relationship level calculation unit, said memory device and said display device to select and display said predetermined number of sub-information out from said plurality of information other than said main information according to said relationship level, and a device connected to said timer, said memory device and said display device to select a portion of information stored in said memory device other than said main information and said predetermined number of sub-information for every predetermined time and replacing the selected information for a part of said predetermined number of sub-information for display.

38. The information retrieval apparatus according to claim 29, further comprising:

a main information history memory unit connected to said main information display unit to store history of said main information, and a main information history display unit connected to said main information history memory unit and said display unit to display main information displayed to date according to said history.

39. The information retrieval apparatus according to claim 29, further comprising:

a registered information memory unit to store information, and an information registration unit connected to said input device and said registered information memory unit to register into said registered information memory unit information selected by said input device out from said main information and said predetermined number of sub-information displayed at said display device.

40. The information retrieval apparatus according to claim 39, further comprising a registered information display unit connected to said registered information memory unit and said display device to display said information stored in said registered information memory unit.

41. The information retrieval apparatus according to claim 29, wherein said memory device comprises an information memory unit storing said plurality of information and detailed information related to each of said plurality of information, further comprising a detailed information display unit connected to said information memory unit and said display unit to display detailed information related to said main information.

42. The information retrieval apparatus according to claim 29, further comprising a partial information assembly generation unit connected to said memory device to generate a partial information assembly constituted by information matching a predetermined condition out from said plurality of information stored in said memory device.

* * * * *